United States Patent
Seo et al.

(10) Patent No.: US 10,359,878 B2
(45) Date of Patent: Jul. 23, 2019

(54) METHOD FOR PROVIDING EVENTS CORRESPONDING TO TOUCH ATTRIBUTES AND ELECTRONIC DEVICE THEREOF

(71) Applicant: Samsung Electronics Co., Ltd., Suwon-si, Gyeonggi-do (KR)

(72) Inventors: Jeongwook Seo, Daegu (KR); Doo-Yong Park, Gumi-si (KR); Young-Gyun Lee, Gumi-si (KR); Youngdae Lee, Daegu (KR); Jaehak Lee, Gumi-si (KR); Eun-Yeung Lee, Gumi-si (KR); Cheongjae Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 15/245,688

(22) Filed: Aug. 24, 2016

(65) Prior Publication Data

US 2017/0090653 A1 Mar. 30, 2017

(30) Foreign Application Priority Data

Sep. 24, 2015 (KR) .......................... 10-2015-0135564

(51) Int. Cl.
G06F 3/044 (2006.01)
G06F 3/041 (2006.01)
G06F 3/0488 (2013.01)

(52) U.S. Cl.
CPC .......... *G06F 3/0416* (2013.01); *G06F 3/0412* (2013.01); *G06F 3/04883* (2013.01); *G06F 3/044* (2013.01)

(58) Field of Classification Search
CPC ...... G06F 3/0416; G06F 3/044; G06F 3/0412; G06F 3/04883
See application file for complete search history.

(56) References Cited

U.S. PATENT DOCUMENTS

2010/0317410 A1* 12/2010 Song ................... G06F 3/04886
455/566
2012/0284789 A1* 11/2012 Kim ...................... G06F 1/1694
726/19

(Continued)

FOREIGN PATENT DOCUMENTS

| EP | 2 919 102 A1 | 9/2015 |
| KR | 10-2006-0084945 A | 7/2006 |
| KR | 10-2013-0030177 A | 3/2013 |

OTHER PUBLICATIONS

European Search Report dated Jul. 27, 2018; European Appln. No. 16848941.7 / 1231/3353642.

*Primary Examiner* — Jonathan A Boyd
(74) *Attorney, Agent, or Firm* — Jefferson IP Law, LLP

(57) ABSTRACT

An apparatus and a method for generating events corresponding to the touch attributes in the electronic device are provided. The apparatus, including an electronic device, may include a touch sensor and a processor. The processor is configured to control for determining at least one touch attribute including at least one of an intensity, an area, and a direction of a touch input based on a change in the capacitance in the touch sensor due to the touch input on the touch sensor, and executing a function corresponding to a predetermined criterion if the at least one touch attribute satisfies the predetermined criterion.

15 Claims, 25 Drawing Sheets

(56) References Cited

U.S. PATENT DOCUMENTS

2013/0063366 A1    3/2013  Paul
2013/0111342 A1    5/2013  Alameh et al.
2013/0300702 A1   11/2013  Kang et al.
2015/0261378 A1*   9/2015  Lee ...................... G06F 3/0416
                                                    345/173

* cited by examiner

METHOD FOR PROVIDING EVENTS CORRESPONDING TO TOUCH ATTRIBUTES AND ELECTRONIC DEVICE THEREOF

CROSS REFERENCE TO RELATED APPLICATION(S)

This application claims the benefit under 35 U.S.C. § 119(a) of a Korean patent application filed on Sep. 24, 2015 in the Korean Intellectual Property Office and assigned Serial number 10-2015-0135564, the entire disclosure of which is hereby incorporated by reference.

TECHNICAL FIELD

The present disclosure relates to an apparatus and a method for generating events corresponding to touch attributes in an electronic device.

BACKGROUND

With the increase in the use of multimedia services using electronic devices, the amount of information that is to be processed and displayed in the electronic devices is also increasing. According to this, there has been a growing interest in an electronic device having a touch screen that improves the space utilization in order to thereby increase the size of the display unit.

The touch screen can perform the input and display of information in a single screen. Accordingly, the electronic device can eliminate a separate input device, such as a keypad, by adopting the touch screen in order to thereby increase the display area.

The above information is presented as background information only to assist with an understanding of the present disclosure. No determination has been made, and no assertion is made, as to whether any of the above might be applicable as prior art with regard to the present disclosure.

SUMMARY

The electronic device adopting the touch screen may generate events by using a touch position corresponding to a touch input that is detected through the touch screen. That is, the electronic device utilizes only the touch position among the information that is generated by the touch input, so the electronic device can provide limited events.

Aspects of the present disclosure are to address at least the above-mentioned problems and/or disadvantages and to provide at least the advantages described below. Accordingly, an aspect of the present disclosure is to provide an apparatus and a method for generating a variety of events by using information that is generated by the touch input in the electronic device.

In accordance with an aspect of the present disclosure, an electronic device is provided. The electronic device may include a touch sensor and a processor configured to control for detecting a touch input by using the touch sensor, wherein the detecting includes determining touch attributes including the intensity of the touch input, the direction of the touch input, or the time duration of the touch input, at least based on a change in the capacitance that is caused in relation to the touch input, executing a predetermined function if the touch attributes satisfy a predetermined criterion, and not executing the predetermined function if the touch attributes does not satisfy the predetermined criterion.

In accordance with another aspect of the present disclosure, an electronic device is provided. The electronic device may include a touch sensor and a processor configured to control for: determining touch attributes including at least one of the intensity of the touch input, an area in the touch sensor of the touch input, or the direction of the touch input, at least based on a change in a capacitance in the touch sensor due to the touch input and executing a function corresponding to a predetermined criterion if the touch attributes satisfy the predetermined criterion.

In accordance with another aspect of the present disclosure, an operating method of an electronic device is provided. The operating method may include determining touch attributes including at least one of an intensity, a direction, or a time duration of a touch input, at least based on a change in a capacitance caused by the touch input on a touch sensor that is functionally connected to the electronic device and executing a predetermined function if the touch attributes satisfy a predetermined criterion.

In accordance with another aspect of the present disclosure, an operating method of an electronic device is provided. The operating method may include determining touch attributes including at least one of an intensity, an area, and a direction of a touch input, at least based on a change in a capacitance caused by the touch input on a touch sensor that is functionally connected to the electronic device and executing a function corresponding to a predetermined criterion if the touch attributes satisfy the predetermined criterion.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
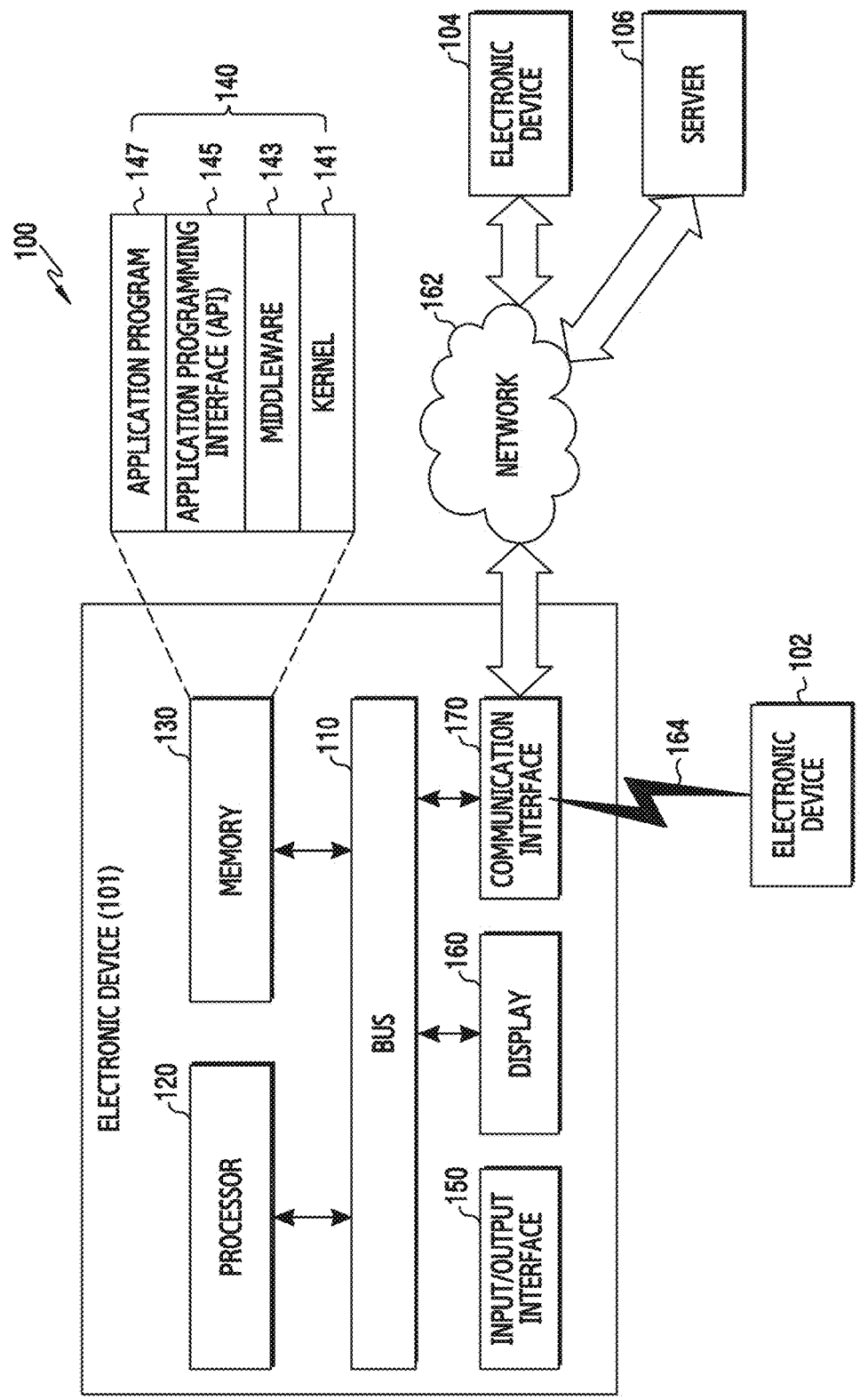
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e g, third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Hereinafter, in various embodiments of the present disclosure, a touch may include a state where an object (for example, a finger, a touch accessory) is a proximity or contact with a touch screen. For example, when using the touch screen of capacitive type, the electronic device may detect a touch input corresponding to the change in capacitance caused by proximity or contact with the object. For example, the touch accessory may include at least one of a conductive object and a resonance screen.

FIG. 1 illustrates an electronic device in a network environment 100 according to various embodiments of the present disclosure.

Referring to FIG. 1, The electronic device 101 may include a bus 110, a processor 120 (e.g., including processing circuitry), a memory 130, an input/output interface 150 (e.g., including input/output circuitry), a display 160 (e.g., including a display panel and display circuitry), and a communication interface 170 (e.g., including communication circuitry). In some embodiments, the electronic device 101 may omit at least one of the above elements or may further include other elements.

The bus 110 may include, for example, a circuit that interconnects the components 120 to 170 and delivers communication (for example, a control message and/or data) between the components 120 to 170.

The processor 120 may include one or more of a CPU, an AP, and a communication processor (CP). For example, the processor 120 may carry out operations or data processing relating to control and/or communication of at least one other element of the electronic device 101.

According to an embodiment of the present disclosure, when a touch input is detected through the input/output interface 150 (e.g., the touch panel), the processor 120 may detect the position (a touch position) of the touch input. For example, the processor 120 may determine, as a touch position, the position in which the maximum capacitance is obtained in the touch region where a change in the capacitance has been detected. For example, the processor 120 may determine, as a touch position, the centroid position of the touch region where a change in the capacitance has been detected.

According to an embodiment of the present disclosure, when a touch input is detected through the input/output interface 150 (e.g., the touch panel), the processor 120 may detect attributes (touch attributes) on the touch input. For example, the processor 120 may detect the area of the touch region where a change in the capacitance (the touch input) has been detected. For example, the processor 120 may detect the intensity of the touch input (the capacitance intensity) corresponding to the change in the capacitance. For example, the capacitance intensity may include a capacitance change value, a relative change value of the capacitance compared to the maximum capacitance intensity, or a change value of the capacitance per unit time. For example, the processor 120 may detect the movement direction of a touch input corresponding to the change in the capacitance. For example, the movement direction of the touch input may be detected by a difference value between a change value according to the movement of the touch position or the centroid position of the touch region and the position of the capacitance intensity. For example, the processor 120 may detect the rotation direction of a touch input corresponding to a change in the capacitance. For example, the rotation direction of the touch input may be detected by a change value of the touch region. For example, the processor 120 may detect a touch holding time of the position (touch position) with respect to the touch input.

According to an embodiment of the present disclosure, the processor 120 may generate events corresponding to touch attributes. For example, the processor 120 may generate events that correspond to at least one of: the touch intensity (the capacitance intensity); the touch direction; or the touch area. For example, the touch direction may include at least one of the touch movement direction or the touch rotation direction. For example, if the touch holding time with respect to the touch position exceeds a reference time, the processor 120 may generate an event that corresponds to at least one of the touch intensity (the capacitance intensity), the touch direction, or the touch area. For example, the processor 120 may generate events corresponding to the characteristics of the content that is selected by the touch input and the touch attributes thereof. For example, the touch attributes may include at least one of the touch intensity, the touch direction, or the touch area.

According to an embodiment of the present disclosure, the processor 120 may configure or update event generation criteria (a reference value) to correspond to the touch attributes.

With reference to FIG. 1, the memory 130 may include a volatile memory and/or a non-volatile memory. The memory 130, for example, may store instructions or data (e.g., a reference distance) in relation to one or more other elements of the electronic device 101.

According to an embodiment of the present disclosure, the memory 130 may store the event generation criteria information. For example, the memory 130 may store a reference touch attribute value for generating the events.

According to an embodiment of the present disclosure, with reference to FIG. 1, the memory 130 may store software and/or programs 140. For example, the programs may include a kernel 141, middleware 143, an application programming interface (API) 145, or application programs (or "applications") 147. At least some of the kernel 141, the middleware 143, or the API 145 may be referred to as an operating system (OS).

The input/output interface 150, for example, may serve as an interface to transfer instructions or data input from the user or other external devices to other elements of the electronic device 101. In addition, the input/output interface 150 may output instructions or data received from other elements of the electronic device 101 to the user or other external devices. According to an embodiment of the present disclosure, the input/output interface 150 may include a touch panel for detecting a touch input or a hovering input by using electronic pens or by using a part of the user's body. For example, the touch panel may detect a touch input or a hovering input based on a change in the capacitance caused by the electronic pen or a part of the user's body in a capacitive method. According to an embodiment of the present disclosure, the input/output interface 150 may receive a gesture input or a proximity input by using the electronic pens or by using a part of the user's body.

The display 160, for example, may display a variety of content (e.g., text, images, videos, icons, symbols, or the like) to the user. According to an embodiment of the present disclosure, the display 160 may display a shared area to be distinguished from the remaining area. According to an embodiment of the present disclosure, the display 160 may display activation information of an additional description mode by using display variables or icons of the shared area. For example, the display variables may contain at least one of color, transparency, shading, or contrast.

The communication interface 170, for example, may configure communication between the electronic device 101 and external devices. For example, the communication interface 170 may be connected to the network 162 through wireless communication or wired communication in order to thereby communicate with external devices (e.g., the second external electronic device 104 or the server 106). For example, the communication interface 170 may communicate with external devices (e.g., the first external electronic device 102) through short-range communication 164 or wired communication.

According to an embodiment of the present disclosure, the network 162 may include at least one of a telecommunication network, a computer network (e.g., local area network (LAN) or wide area network (WAN)), the Internet, or a telephone network.

According to an embodiment of the present disclosure, the touch panel of the input/output interface 150 and the display 160 may be configured as a single module, which may be referred to as a touch screen.

Figure 2:
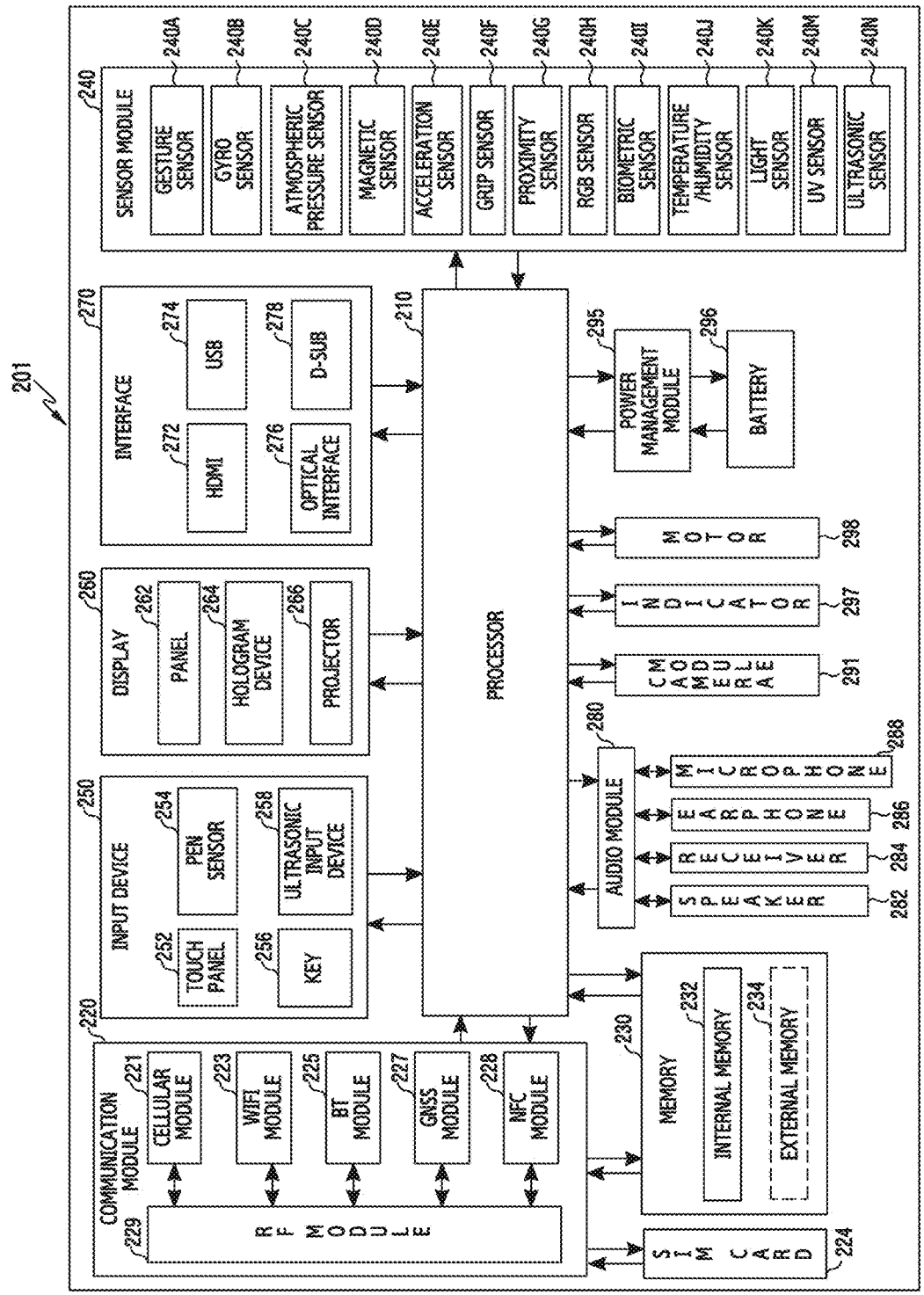
FIG. 2 illustrates a block diagram of an electronic device according to various embodiments of the present disclosure.

FIG. 2 is a block diagram of the electronic device 201 according to various embodiments.

Referring to FIG. 2, the electronic device 201, for example, may include all or some of the elements of the electronic device 101 shown in FIG. 1. The electronic device 201 may include one or more processors (e.g., application processors (APs) 210, a communication module 220, a subscriber identification module 224, a memory 230, a sensor module 240, an input device 250, a display 260, an interface 270, an audio module 280, a camera module 291, a power management module 295, a battery 296, an indicator 297, or a motor 298.

The processor 210, for example, may control a multitude of hardware or software elements connected with the processor 210, and may perform the processing of various pieces of data and a calculation by executing an OS or application programs. The processor 210 may be implemented by, for example, a system on chip (SoC). According to an embodiment of the present disclosure, the processor 210 may further include a graphic processing unit (GPU) and/or an image signal processor. The processor 210 may include at least some (e.g., the cellular module 221) of the elements shown in FIG. 2. The processor 210 may load instructions or data received from one or more other elements (e.g., a non-volatile memory) to a volatile memory to then process the same, and may store a variety of data in a non-volatile memory.

According to an embodiment of the present disclosure, the processor 210 may generate events based on the touch attributes that are detected by the touch panel 252. For example, the touch attributes may include at least one of the touch intensity (the capacitance intensity), the touch direction, the touch time, or the touch area.

The communication module 220 may have a configuration equal or similar to that of the communication interface 170 of FIG. 1. The communication module 220 may include, for example, a cellular module 221, a wireless fidelity (Wi-Fi) module 223, a Bluetooth (BT) module 225, a global navigation satellite system (GNSS) module 227 (e.g., a global positioning system (GPS) module, a Glonass module, a Beidou module, or a Galileo module), a near field communication (NFC) module 228, and a radio frequency (RF) module 229.

The cellular module 221 may provide, for example, an application call, a video call, a text message service, or an Internet service through a communication network. According to an embodiment of the present disclosure, the cellular module 221 may distinguish and authenticate the electronic device 201 in the communication network by using a subscriber identification module (e.g., the subscriber identity module (SIM) card 224). According to an embodiment of the present disclosure, the cellular module 221 may perform at least some of the functions that the AP 210 may provide. According to an embodiment of the present disclosure, the cellular module 221 may include a communication processor (CP).

Referring to FIG. 2, the Wi-Fi module 223, the BT module 225, the GPS module 227, or the NFC module 228 may include, for example, a processor for processing data transmitted/received through the corresponding module. According to an embodiment of the present disclosure, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another embodiment of the present disclosure, at least one of the cellular module 221, the Wi-Fi module 223, the BT module 225, the GPS or GNSS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

Referring to FIG. 2, the memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor or biometric sensor 240I, a temperature/humidity sensor 240J, an illumination or light sensor 240K, an ultraviolet (UV) sensor 240M, and an ultrasonic sensor 240N. Additionally or alternatively, the sensor module 240 may include additional sensors (not shown), such as an electronic nose (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further include a processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a digital stylus or (digital) pen sensor 254, a key 256, or an ultrasonic input device 258. The touch panel 252 may use at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The digital stylus or (digital) pen sensor 254 may be, for example, a part of the touch panel 252, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

Referring to FIG. 2, the display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

Referring to FIG. 2, the interface 270 may include, for example, a high-definition multimedia interface (HDMI) 272, a universal serial bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 150 illustrated in FIG. 1. The audio module 280 may, for example, process sound information that is input or output through the speaker 282, the receiver 284, the earphones 286, the microphone 288, or the like.

The camera module 291 may be, for example, a device that can take a still image or a moving image, and according to an embodiment of the present disclosure, the camera module 291 may include one or more image sensors (e.g., a front sensor or a rear sensor), a lens, an image signal processor (ISP), or a flash (e.g., a light emitting diode (LED) or a xenon lamp).

The power management module 295 may, for example, manage power of the electronic device 201. According to an embodiment of the present disclosure, the power management module 295 may include a power management integrated circuit (PMIC), a charger IC, or a battery or fuel gauge. The battery 296 may include, for example, a rechargeable battery or a solar battery.

Referring to FIG. 2, the indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration or haptic effect.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 3:
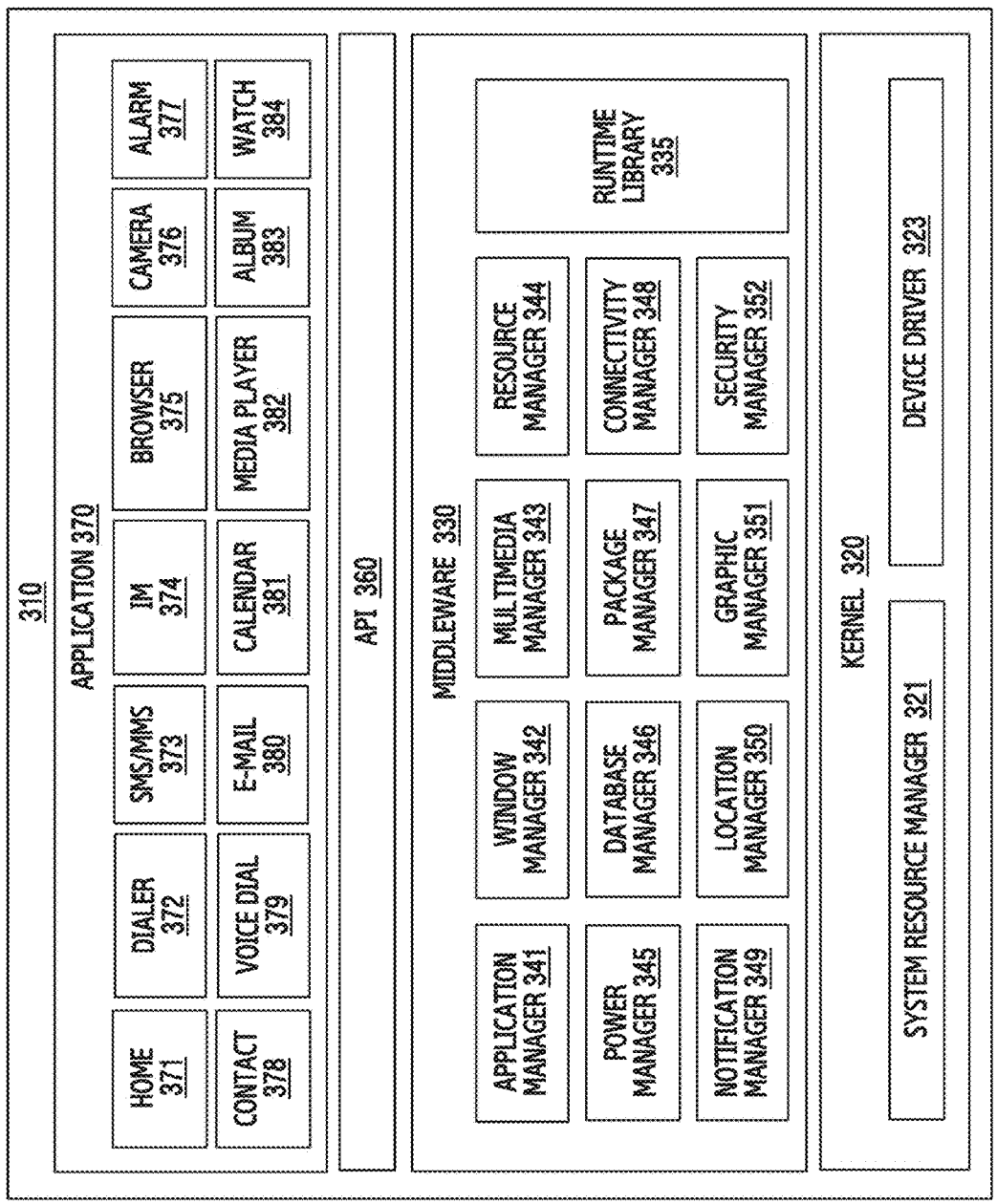
FIG. 3 illustrates a block diagram of a program module according to various embodiments of the present disclosure.

FIG. 3 illustrates a block diagram of a program module according to various embodiments of the present disclosure. According to an embodiment of the present disclosure, the program module 310 (e.g., the program 140) may include an operating system (OS) that controls resources relating to an electronic device (e.g., the electronic device 101) and/or various applications (e.g., the application 147) executed in the OS. The OS may be, for example, Android, iOS™, Windows™, Symbian™, Tizen™, Bada™, or the like.

Referring to FIG. 3, the programming module 310 may include a kernel 320, middleware 330, an application programming interface (API) 360, and/or applications 370. At least some of the program module 310 may be preloaded in the electronic device, or may be downloaded from an external electronic device (e.g., the electronic device (102, 104), the server 106).

The kernel 320 (e.g., the kernel 141 of FIG. 1) may include, for example, a system resource manager 321 or a device driver 323. The system resource manager 321 may control, allocate, or collect system resources.

The middleware 330 may provide, for example, a function commonly required by the applications 370, or may provide various functions to the applications 370 through the API 360 so that the applications 370 can efficiently use limited system resources within the electronic device. According to an embodiment of the present disclosure, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform input/output management, memory management, the functionality for an arithmetic function, or the like.

Referring to FIG. 3, the application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources, such as a source code, a memory, a storage space, and the like of at least one of the applications 370.

The power manager 345 may operate together with a basic input/output system (BIOS) to manage a battery or power, and may provide power information required for the operation of the electronic device. According to an embodiment of the present disclosure, the power manager 345 may perform a control so that a charge or discharge of a battery is provided through at least one of a wired manner and a wireless manner.

The database manager 346 may generate, search for, or change a database to be used by at least one of the applications 370. The package manager 347 may manage the installation or update of an application distributed in the form of a package file.

The connectivity manager 348 may manage a wireless connection such as, for example, Wi-Fi or Bluetooth (BT). The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like.

According to an embodiment of the present disclosure, when the electronic device (for example, the electronic device 101) has a telephone call function, the middleware 330 may further include a telephony manager for managing an application call function or a video call function of the electronic device.

The middleware 330 may include a middleware module that forms a combination of various functions of the above-described elements. The middleware 330 may provide a specialized module according to each OS in order to provide a differentiated function. Also, the middleware 330 may dynamically delete some of the existing elements, or may add new elements.

The API 360 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as a home 371, a dialer 372, a short message service/multi-media message (SMS/MMS) 373, an instant message (IM) 374, a browser 375, a camera 376, an alarm 377, contacts 378, a voice dialer 379, an e-mail 380, a calendar 381, a media player 382, an album 383, a clock or watch 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device (for example, a short message service (SMS)/multi-media message service (MMS) application, an e-mail application, a health care application, or an environmental information application). Further, the notification relay application can, for example, receive notification information from the external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some elements) or a function of adjusting luminance (or a resolution) of the display), applications operating in the external electronic device, or services provided by the external electronic device (for example, a call service and a message service).

According to an embodiment of the present disclosure, the applications 370 may include applications (for example, a health care application of a mobile medical appliance) designated according to attributes of the external electronic device (for example, the electronic device 102 or 104). According to an embodiment of the present disclosure, the applications 370 may include an application received from the external electronic device (for example, the server 106, or the electronic device 102 or 104). According to an embodiment of the present disclosure, the applications 370 may include a preloaded application or a third party application which can be downloaded from the server. Names of the elements of the program module 310 according to the above-illustrated embodiments may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process, for performing one or more functions.

Figure 4:
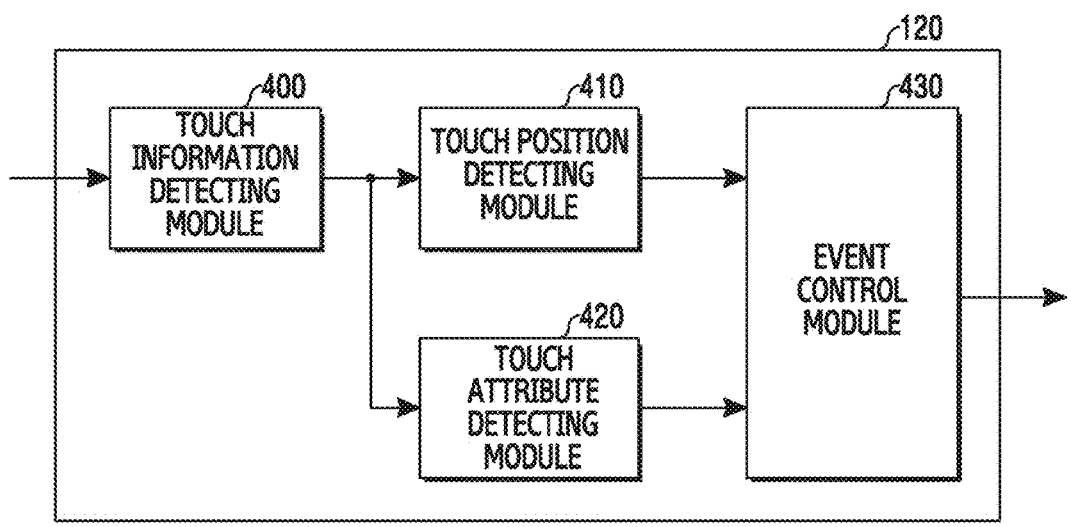
FIG. 4 illustrates a block diagram of a processor configured to control for generating events corresponding to touch attributes according to various embodiments of the present disclosure.

FIG. 4 illustrates a block diagram of a processor for generating events corresponding to the touch attributes according to various embodiments of the present disclosure.

Referring to FIG. 4, the processor 120 of FIG. 1 may include a touch information detecting module 400, a touch position detecting module 410, a touch attribute detecting module 420, and an event control module 430.

According to an embodiment of the present disclosure, the touch information detecting module 400 may detect touch information with respect to the touch screen of the electronic device 101. For example, the touch information detecting module 400 may receive capacitance change information from the touch panel of the input/output interface 150.

According to an embodiment of the present disclosure, the touch position detecting module 410 may detect the touch position based on the touch information that is provided from the touch information detecting module 400. For example, the touch position detecting module 410 may detect a touch position, the position in which a change in the capacitance is greatest in the touch region where a change in the capacitance has been detected. For example, the touch position detecting module 410 may detect, as a touch position, the centroid position of the touch region in which a change in the capacitance has been detected.

According to an embodiment of the present disclosure, with reference to FIG. 4, the touch attribute detecting module 420 may detect touch attributes based on the touch information that is provided from the touch information detecting module 400. For example, the touch attribute detecting module 420 may detect at least one of the touch area, the touch intensity (the capacitance intensity), the touch direction, or the touch time based on the capacitance change information that is provided from the touch information detecting module 400. For example, the touch direction may include at least one of the touch movement direction or the touch rotation direction.

According to an embodiment of the present disclosure, the event control module 430 may generate events corresponding to at least one of: the touch position that is detected by the touch position detecting module 410; or the touch attributes that are detected by the touch attribute detecting module 420. For example, when a change in the capacitance is detected through the touch panel of the input/output interface 150, the event control module 430 may generate events corresponding to at least one of the touch intensity, the touch direction, or the touch area provided from the touch attribute detecting module 420. For example, when a change in the capacitance is detected through the touch panel of the input/output interface 150, the event control module 430 may compare the touch holding time of the touch position, which is provided from the touch position detecting module 410 and the touch attribute detecting module 420, with a reference time. If the touch holding time (duration) of the touch position exceeds the reference time (duration), the event control module 430 may generate an event corresponding to at least one of: the touch intensity; the touch direction; or the touch area, which are provided from the touch attribute detecting module 420. For example, the event control module 430 may generate an event by further considering the characteristics of the content that is selected by the touch input.

According to an embodiment of the present disclosure, the event control module 430 may configure or update the event generation criteria (a reference value) to correspond to the touch attributes that are provided from the touch attribute detecting module 420.

According to an embodiment of the present disclosure, the electronic device 101 may further include a control module for detecting at least one of the position or the attributes with respect to the touch input that is detected through the touch screen (e.g., the touch panel of the input/output interface 150). In this case, the processor 120 may generate events based on at least one of the touch position or the touch attributes that are provided from the control module. For example, the processor 120 may control the generation of the event through the event control module 430 of FIG. 4.

According to various embodiments of the present disclosure, the electronic device may include a touch sensor and a processor that is configured to control for: detecting a touch input by using the touch sensor, wherein the detecting comprises determining touch attributes containing the intensity, the direction, or the time of the touch input at least based on a change in the capacitance that is caused in relation to the touch input; executing a predetermined function if the touch attributes satisfy predetermined criteria; and not executing the predetermined function if the touch attributes do not satisfy the predetermined criteria.

According to various embodiments of the present disclosure, the processor may be configured to determine the touch attribute further based on the area of a region of the touch sensor by which the touch input is detected.

According to various embodiments of the present disclosure, the processor may be configured to control for changing the feedback corresponding to the touch input if the touch attribute is a first intensity, a first direction, or a first time duration; and change the attribute of the feedback if the touch attribute is a second intensity, a second direction, or a second time duration.

According to various embodiments of the present disclosure, the processor may be configured to control for: executing, as at least a part of the predetermined function, such as a first predetermined function if the touch attribute is a first intensity, a first direction, or a first time duration; and execute, as at least a part of the predetermined function, a second predetermined function if the touch attribute is a second intensity, a second direction, or a second time duration.

According to various embodiments of the present disclosure, the electronic device may further include a display, and the touch sensor may be formed as at least a part of the display.

According to various embodiments of the present disclosure, the electronic device may include a touch sensor and a processor that is configured to control for: determining touch attributes including at least one of an intensity, an area, or a direction of the touch input, at least based on a change in the capacitance that is caused in relation to the touch input by using the touch sensor; and executing a function corresponding to a predetermined criterion if the touch attributes satisfy the predetermined criterion.

According to various embodiments of the present disclosure, the processor may be configured to control for determining the position of the touch input, at least based on a change in the capacitance caused in relation to the touch input.

According to various embodiments of the present disclosure, the processor may be configured to control for executing one of: a releasing of a locked screen; an execution of an application program; or an execution of a control menu if the touch attributes satisfy a predetermined criterion.

According to various embodiments of the present disclosure, the touch attributes may further include the time duration of the touch input.

According to various embodiments of the present disclosure, the touch direction may include at least one of the movement direction or the rotation direction of the touch input.

According to various embodiments of the present disclosure, the electronic device may further include a display, and the touch sensor may be formed as at least a part of the display.

Figure 5:
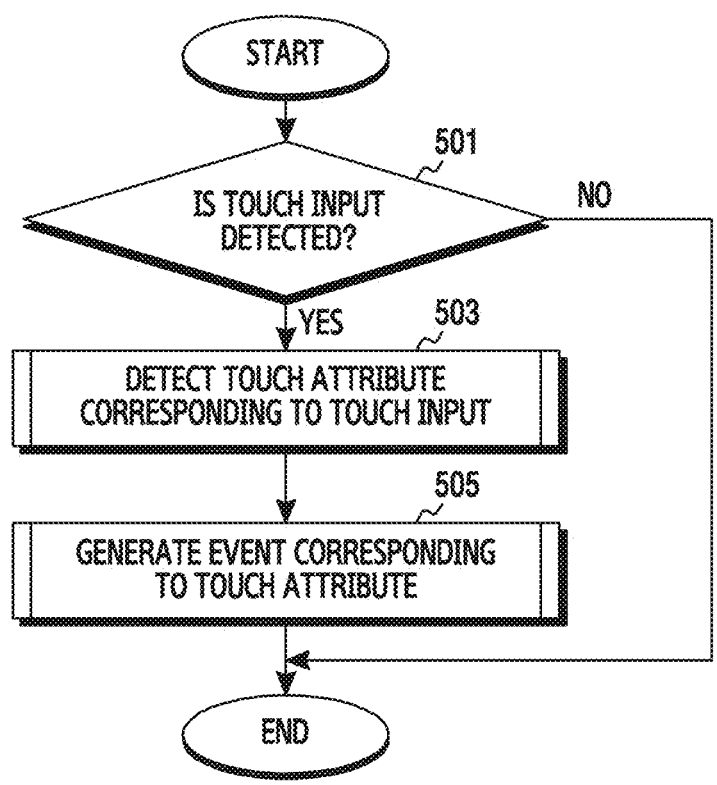
FIG. 5 is a flowchart for generating events corresponding to touch attributes in the electronic device according to various embodiments of the present disclosure.

FIG. 5 is a flowchart for generating events corresponding to the touch attributes in the electronic device according to various embodiments of the present disclosure.

Referring to FIG. 5, in operation 501, the electronic device (e.g., the electronic device 101 of FIG. 1 or the electronic device 201 of FIG. 2) may check whether or not a touch input is detected. For example, the processor 120 may check whether or not a change in the capacitance is detected by the proximity or contact of input means with respect to the touch panel of the input/output interface 150.

If a touch input is detected, the electronic device may detect touch attribute or attributes corresponding to the touch input in operation 503. For example, the touch attribute(s) may include at least one of a touch intensity, a touch direction, a touch area, or a touch time duration. For example, the processor 120, illustrated in FIG. 1, may determine, the touch intensity, and the capacitance change value caused by the touch input. That is, the touch intensity may be determined by the area of the touch region where the change in the capacitance has been detected and by the distance between the touch panel and the input means. For example, the processor 120 may be configured to control for detecting the touch direction based on a change in the touch region where the change in the capacitance has been detected. For example, the processor 120 may be configured to control for detecting the touch direction by a difference value between the centroid position of the touch region where the change in the capacitance has been detected and the position of the capacitance intensity. For example, the touch direction may include at least one of the touch movement direction or the touch rotation direction.

In operation 505, the electronic device may generate an event corresponding to the touch attributes. For example, the processor 120 may execute a function corresponding to an event generation criterion that is satisfied by the touch attributes among one or more event generation criteria. For example, the event generation criteria may be predetermined, or may be created or updated based on the touch attributes.

Figure 6:
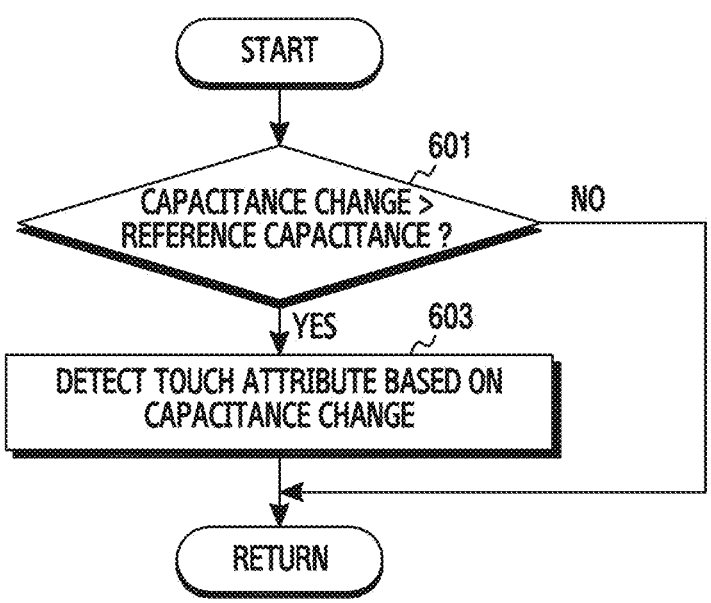
FIG. 6 is a flowchart for detecting touch attributes in the electronic device according to various embodiments of the present disclosure.

FIG. 6 is a flowchart for detecting the touch attributes in the electronic device according to various embodiments of the present disclosure. Hereinafter, the operation for detecting the touch attributes in operations 501 and 503 of FIG. 5 will be described with reference to FIGS. 8A and 8B.

Referring to FIG. 6, in operation 601, the electronic device (e.g., the electronic device 101 of FIG. 1 or the electronic device 201 of FIG. 2) may identify whether or not a change in the capacitance caused by the touch input exceeds a reference capacitance. For example, the touch panel 820 may be configured in the form of a two-dimensional plane of X profile and Y profile as shown in diagram of FIG. 8B, and may be applied with an AC voltage in a grid. When the input means 810 (e.g., one or more fingers of the user) come into contact with the touch screen 800 (e.g., the touch panel) as shown in diagram of FIG. 8A, the processor 120 may detect a change in the capacitance (a capacitance change) with respect to the touch region 812 of the touch panel 820 as shown in diagram of FIG. 8B. If a capacitance change of more than a reference capacitance is detected, the processor 120 may determine that the touch input has been detected.

If a capacitance change caused by the touch input is equal to, or less than, a reference capacitance, the electronic device may determine that the touch input has not been detected.

If a capacitance change caused by the touch input exceeds a reference capacitance, the electronic device may detect the attributes on the touch input (the touch attributes) based on the capacitance change in operation 603. For example, the processor 120 may detect the touch attributes that contains at least one of the touch area, the touch intensity, the touch direction, or the touch time based on the capacitance change.

Figure 7:
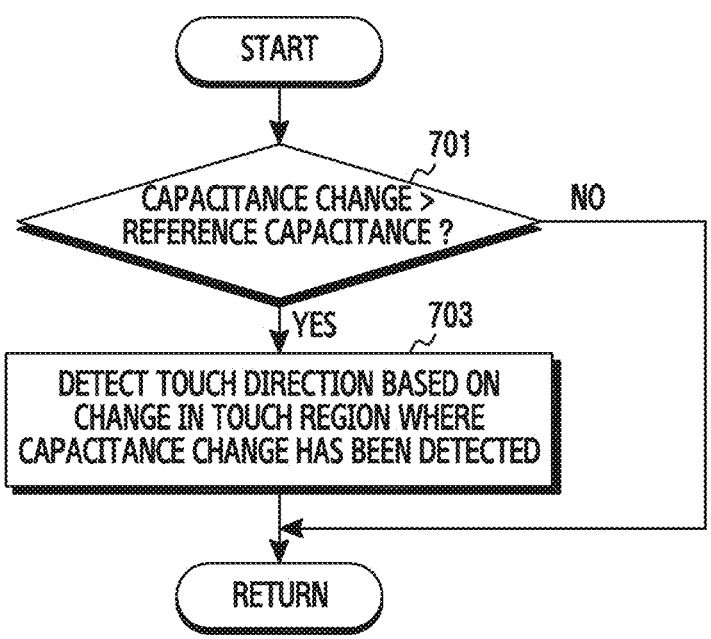
FIG. 7 is a flowchart for detecting the direction of a touch input in the electronic device according to various embodiments of the present disclosure.

FIG. 7 is a flowchart for detecting the direction of a touch input in the electronic device according to various embodiments of the present disclosure. Hereinafter, the operation of detecting the touch attributes in operations 501 and 503 of FIG. 5 will be described with reference to FIGS. 9A to 9C.

Referring to FIG. 7, in operation 701, the electronic device (e.g., the electronic device 101 of FIG. 1 or the electronic device 201 of FIG. 2) may check whether or not a capacitance change caused by the touch input exceeds a reference capacitance. For example, the touch panel of the input/output interface 150 (illustrated in FIG. 1) may remain in the state in which an AC voltage is applied as shown in diagram of FIG. 9A. When the input means (such as fingers) approach the touch screen (e.g., the touch panel) as shown in diagram of FIG. 9B (see hovering 910), the processor 120 may detect a capacitance change caused by the input means. In addition, when the input means (such as fingers) come into contact with the touch screen (e.g., the touch panel) as shown in diagram of FIG. 9C (see touch 920), the processor 120 may detect a capacitance change caused by the input means. If a capacitance change of more than a reference capacitance is detected, the processor 120 may determine that the touch input has been detected.

If a capacitance change caused by the touch input is equal to, or less than, a reference capacitance, the electronic device may determine that the touch input has not been detected.

In operation 703, if a capacitance change caused by the touch input exceeds a reference capacitance, the electronic device may detect the direction of the touch input (the touch direction) based on a change in the touch region where the capacitance change has been detected. For example, the processor 120 may detect the touch movement direction or rotation direction based on a change in the touch position corresponding to a change in the touch region where the capacitance change has been detected. For example, the processor 120 may detect the touch movement direction based on the size change direction of the touch region where the capacitance change has been detected. For example, the processor 120 may detect the touch rotation direction based on a change form (e.g., the direction or shape) of the touch region where the capacitance change has been detected.

Figure 8A:
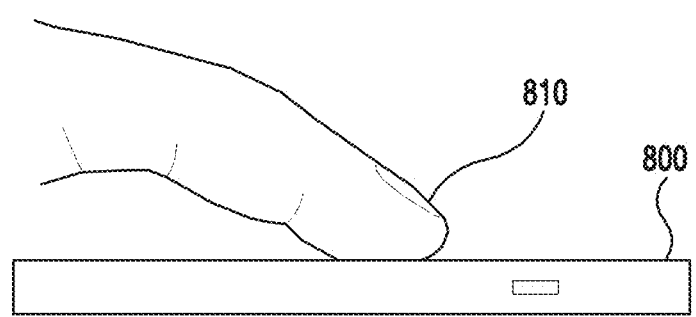
FIGS. 8A and 8B illustrate a configuration for detecting a touch input in the electronic device according to various embodiments of the present disclosure.
Figure 8B:
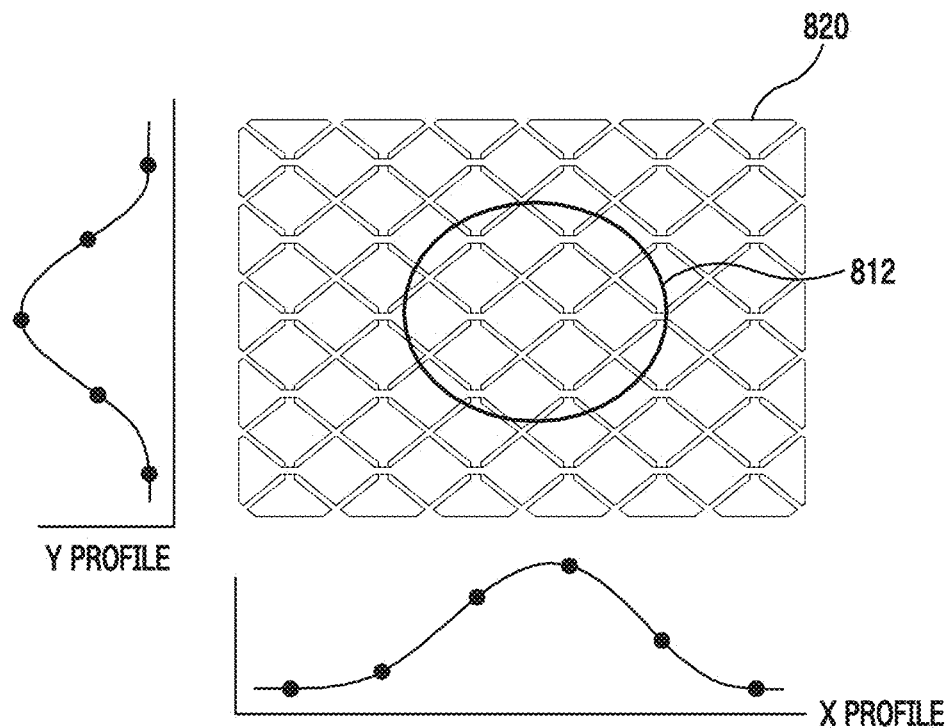

FIGS. 8A and 8B illustrate a configuration for detecting a touch input in the electronic device according to various embodiments of the present disclosure. FIG. 6, as described above, provides a flowchart for the configuration for detecting a touch input in the electronic device illustrated in FIGS. 8A and 8B.

Figure 9A:
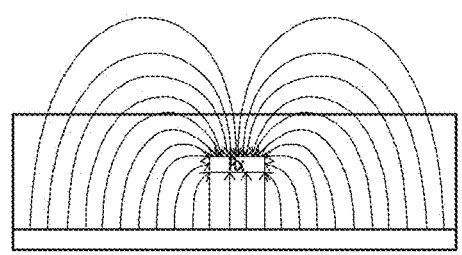
FIGS. 9A to 9C illustrate a configuration for detecting a touch input by using a change in the capacitance in the electronic device according to various embodiments of the present disclosure.
Figure 9B:
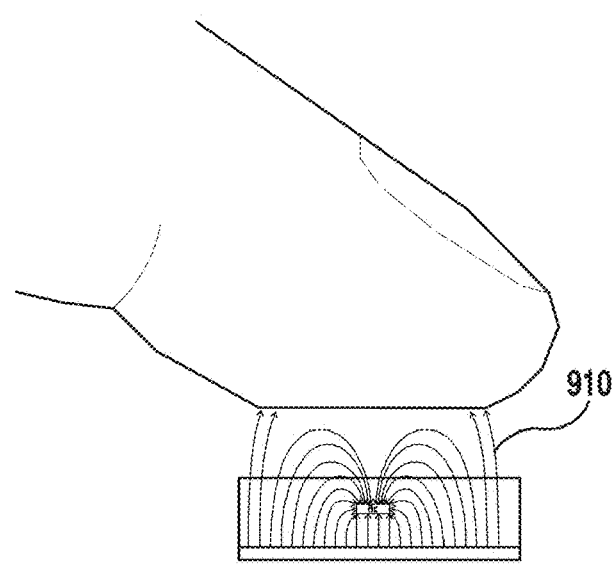
Figure 9C:
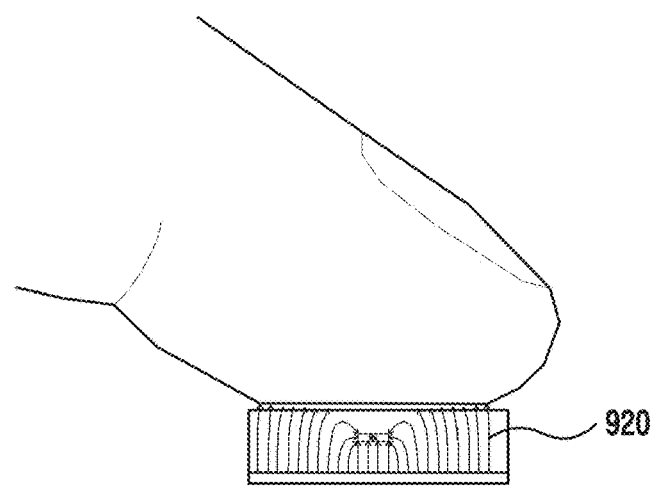

FIGS. 9A to 9C illustrate a configuration for detecting a touch input by using a change in the capacitance in the electronic device according to various embodiments of the present disclosure. FIG. 7, as described above, provides a flowchart for the configuration for detecting a touch input by using a change in the capacitance in the electronic device illustrated in FIGS. 9A to 9C.

Figure 10:
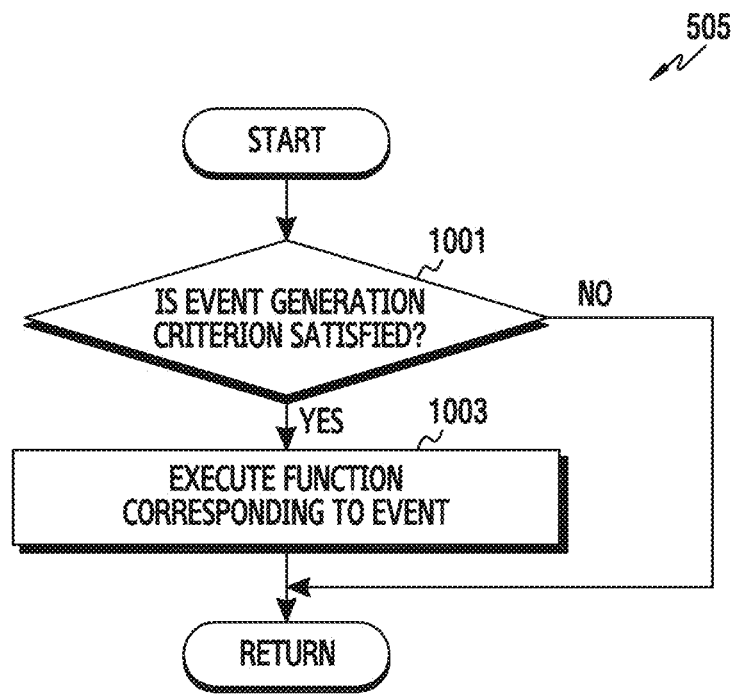
FIG. 10 illustrates a flowchart for detecting events corresponding to touch attributes in the electronic device according to various embodiments of the present disclosure.

FIG. 10 illustrates a flowchart for detecting events corresponding to the touch attributes in the electronic device according to various embodiments of the present disclosure. Hereinafter, the operation for detecting an event in operation 505 of FIG. 5 will be described with reference to FIG. 12.

Referring to FIG. 10, in operation 1001, the electronic device (e.g., the electronic device 101 of FIG. 1 or the electronic device 201 of FIG. 2) may check if there is an event generation criterion that is satisfied by the touch attributes (the touch attributes detected in operation 503 of FIG. 5). For example, the processor 120 may check if there is an event generation criterion that is satisfied by the touch attributes detected in operation 503 of FIG. 5 among a plurality of event generation criteria, such as P1 (1200), P2 (1210), or P3 (1220) in FIG. 12. For example, the event generation criteria may be updated to correspond to the touch attributes.

In operation 1003, the electronic device may execute a function corresponding to the event generation criterion that is satisfied by the touch attributes. For example, the processor 120 may execute an application corresponding to the event generation criterion that is satisfied by the touch attributes. For example, the processor 120 may execute a control menu corresponding to the event generation criterion that is satisfied by the touch attributes.

Figure 11:
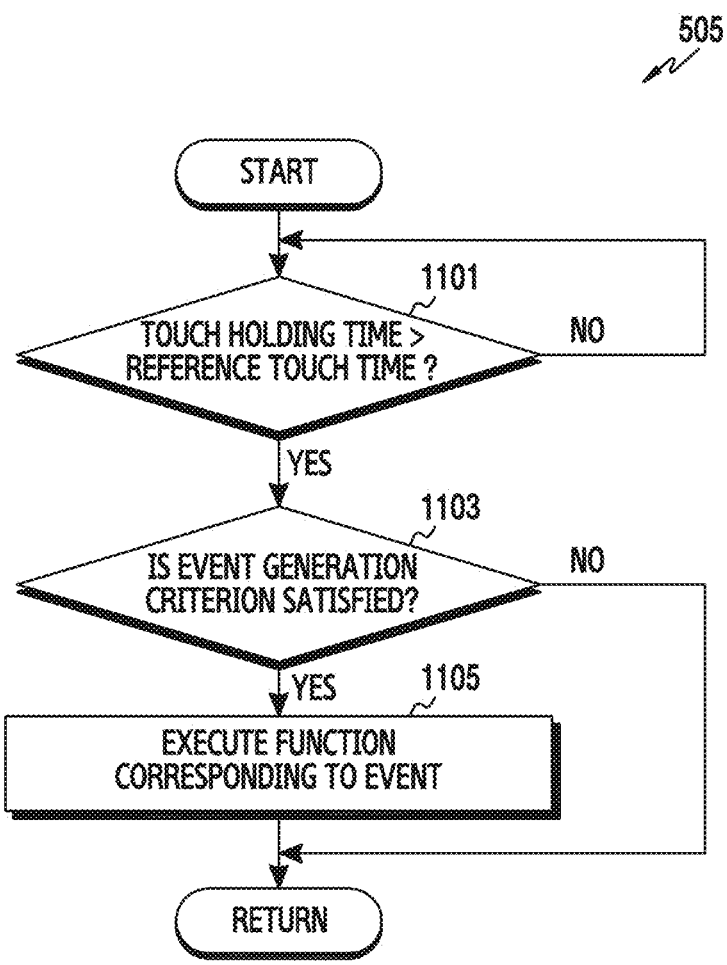
FIG. 11 illustrates a flowchart for generating events based on a touch time in the electronic device according to various embodiments of the present disclosure.

FIG. 11 illustrates a flowchart for generating events based on the touch time in the electronic device according to various embodiments of the present disclosure. Hereinafter, the operation for detecting an event in operation 505 of FIG. 5 will be described.

Referring to FIG. 11, in operation 1101, the electronic device (e.g., the electronic device 101 of FIG. 1 or the electronic device 201 of FIG. 2) may check whether or not the holding time of the touch input exceeds a reference touch time. For example, the processor 120 may check whether or not the touch holding time of the touch position detected by the touch input exceeds a reference touch time.

In operation 1103, if the holding time of the touch input exceeds a reference touch time, the electronic device may check if there is an event generation criterion that is satisfied by the touch attributes (the touch attributes detected in operation 503 of FIG. 5). For example, the processor 120 may check if there is an event generation criterion that is satisfied by at least one of: the touch intensity; the touch direction; or the touch area, which are detected in operation 503 of FIG. 5 among a plurality of event generation criteria. For example, the event generation criteria may be updated to correspond to the touch attributes.

In operation 1105, the electronic device may execute a function corresponding to the event generation criterion that is satisfied by the touch attributes. For example, the processor 120 may execute an application or a control menu corresponding to the event generation criterion that is satisfied by the touch attributes.

Figure 12:
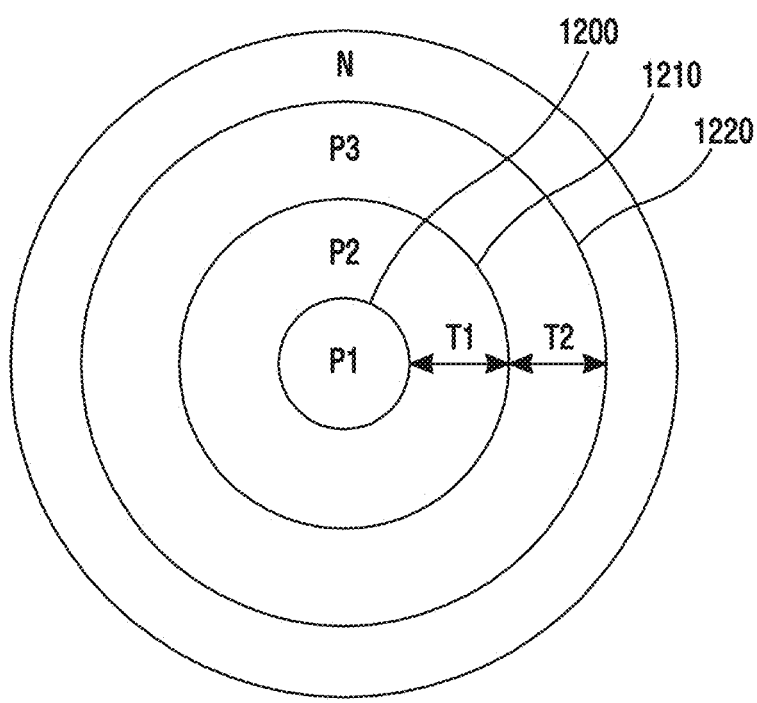
FIG. 12 illustrates criteria for generating events corresponding to touch attributes according to various embodiments of the present disclosure.

FIG. 12 illustrates criteria for generating events corresponding to touch attributes according to various embodiments of the present disclosure. FIG. 12 further describes the operation for detecting an event in operation 505 of FIG. 5, as described above.

Figure 13:
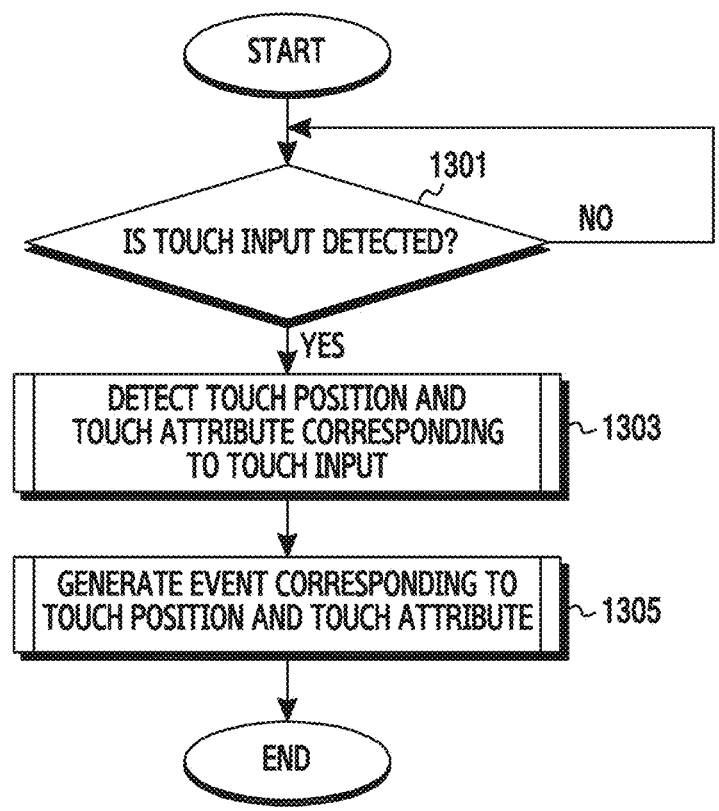
FIG. 13 illustrates a flowchart for generating events corresponding to a touch position and touch attributes in the electronic device according to various embodiments of the present disclosure.

FIG. 13 illustrates a flowchart for generating events corresponding to the touch position and the touch attributes in the electronic device, according to various embodiments of the present disclosure.

Referring to FIG. 13, in operation 1301, the electronic device (e.g., the electronic device 101 of FIG. 1 or the electronic device 201 of FIG. 2) may check whether or not a touch input is detected through the touch screen. For example, the processor 120 may check whether or not a capacitance change is detected, which exceeds a reference capacitance, through the touch panel of the input/output interface 150. If a capacitance change that exceeds a reference capacitance is detected, the processor 120 may determine that the touch input has been detected.

If the touch input is detected, the electronic device may detect the touch position and the touch attributes corresponding to the touch input in operation 1303. For example, the processor 120 may detect, as the touch position, the position where the capacitance change is greatest in the touch region where the capacitance change has been detected, or may detect, as the touch position, the centroid position of the touch region. For example, the processor 120 may detect at least one touch attribute of: the touch intensity; the touch direction; the touch area; or the touch time corresponding to the capacitance change that exceeds a reference capacitance as shown in FIG. 6 or 7.

With reference to FIG. 13, in operation 1305, the electronic device may generate an event corresponding to the touch position and the touch attributes. For example, the processor 120 may execute a function corresponding to an event generation criterion that is satisfied by the touch attributes based on the characteristics of the content that is selected by the touch position, as shown in FIG. 10 or 11.

Figure 14:
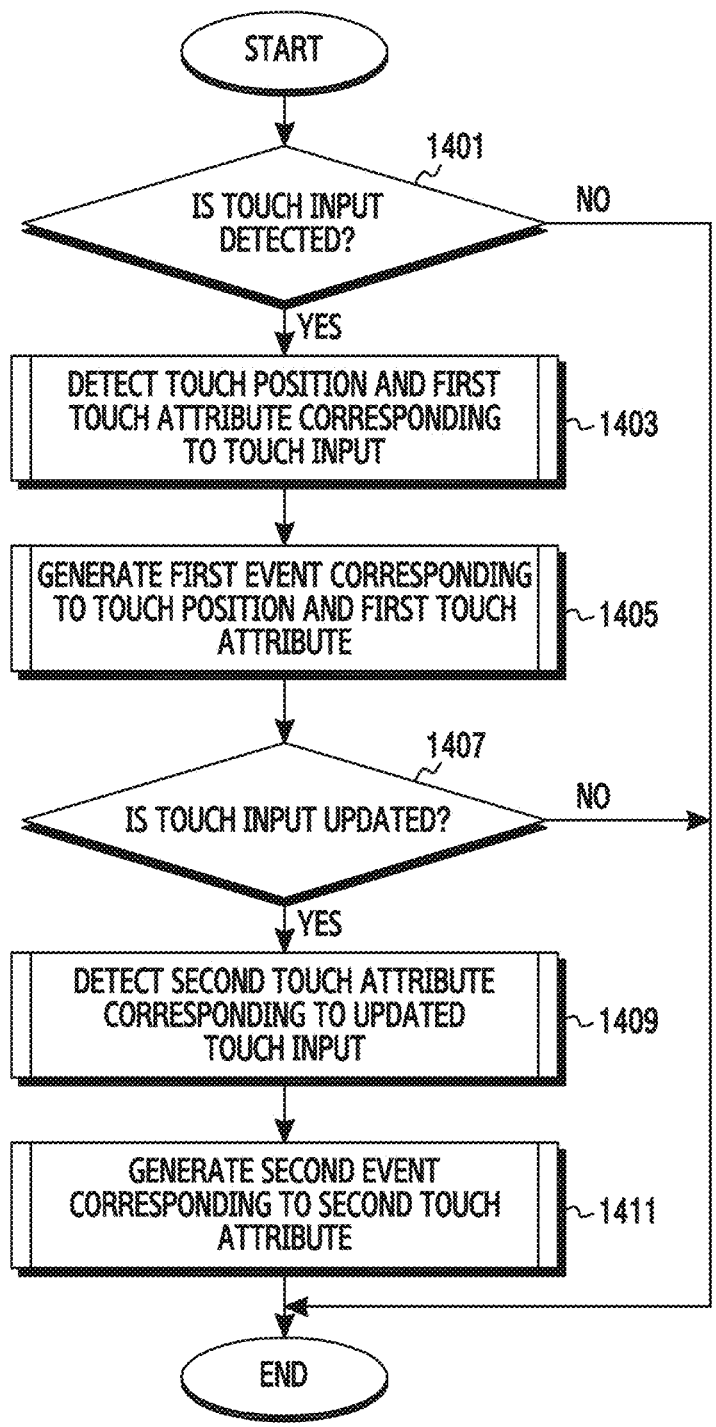
FIG. 14 illustrates a flowchart for generating events corresponding to update information of the touch input in the electronic device according to various embodiments of the present disclosure.

FIG. 14 illustrates a flowchart for generating an event corresponding to update information of the touch input in the electronic device according to various embodiments of the present disclosure. Hereinafter, the operation for generating an event corresponding to the update of the touch input with reference to FIG. 15.

Referring to FIG. 14, in operation 1401, the electronic device (e.g., the electronic device 101 of FIG. 1 or the electronic device 201 of FIG. 2) may check whether or not a touch input is detected through the touch screen. For example, the processor 120 may check whether or not a capacitance change caused by the proximity or contact of the input means with respect to the touch screen is detected.

If the touch input is detected, the electronic device may detect the touch position corresponding to the touch input and the first touch attribute on the corresponding touch position in operation 1403. For example, the processor 120 may detect the touch position based on the touch intensity of the touch region where the capacitance change has been detected or based on the central point of the touch region. For example, the processor 120 may detect the touch attributes on the touch position corresponding to the capacitance change as shown in FIG. 6 or 7.

Referring to FIG. 14, in operation 1405, the electronic device may generate an event corresponding to the touch position and the first touch attribute of the corresponding touch position. For example, the processor 120 may execute an application or a control menu corresponding to the event generation criterion that is satisfied by the touch attributes of the touch position where the capacitance change has been detected as shown in FIG. 10 or 11.

Figure 15:
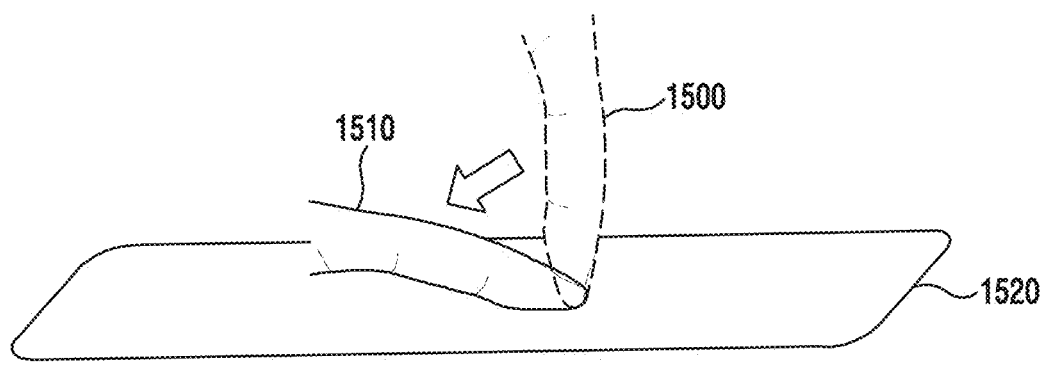
FIG. 15 illustrates a configuration in which the touch input is updated in the electronic device according to various embodiments of the present disclosure.

In operation 1407, the electronic device may check whether or not the touch input is updated. For example, the processor 120 may check whether or not the size of the touch region, in which the capacitance change has been detected, is updated through the change in contact area from object 1500 to object 1510 of the input means with respect to the touch screen 1520 as shown in FIG. 15. For example, the processor 120 may check whether or not the position of the touch region, in which the capacitance change has been detected, is updated.

If the touch input is updated, the electronic device may detect the second touch attribute corresponding to the updated touch input in operation 1409. For example, the processor 120 may detect the second touch attribute based on the updated touch region information. For example, the processor 120 may detect the touch position by means of the updated touch area information and the second touch attribute on the corresponding touch position.

In operation 1411, the electronic device may generate an event corresponding to the second touch attribute. For example, the processor 120 may update the event to be generated to correspond to the touch attribute change. For example, the processor 120 may execute an application or a control menu corresponding to the second touch attribute. For example, the processor 120 may generate an event corresponding to the touch position change and the second touch attribute corresponding to the changed touch position.

FIG. 15 illustrates a configuration in which the touch input is updated in the electronic device according to various embodiments of the present disclosure.

Figure 16:
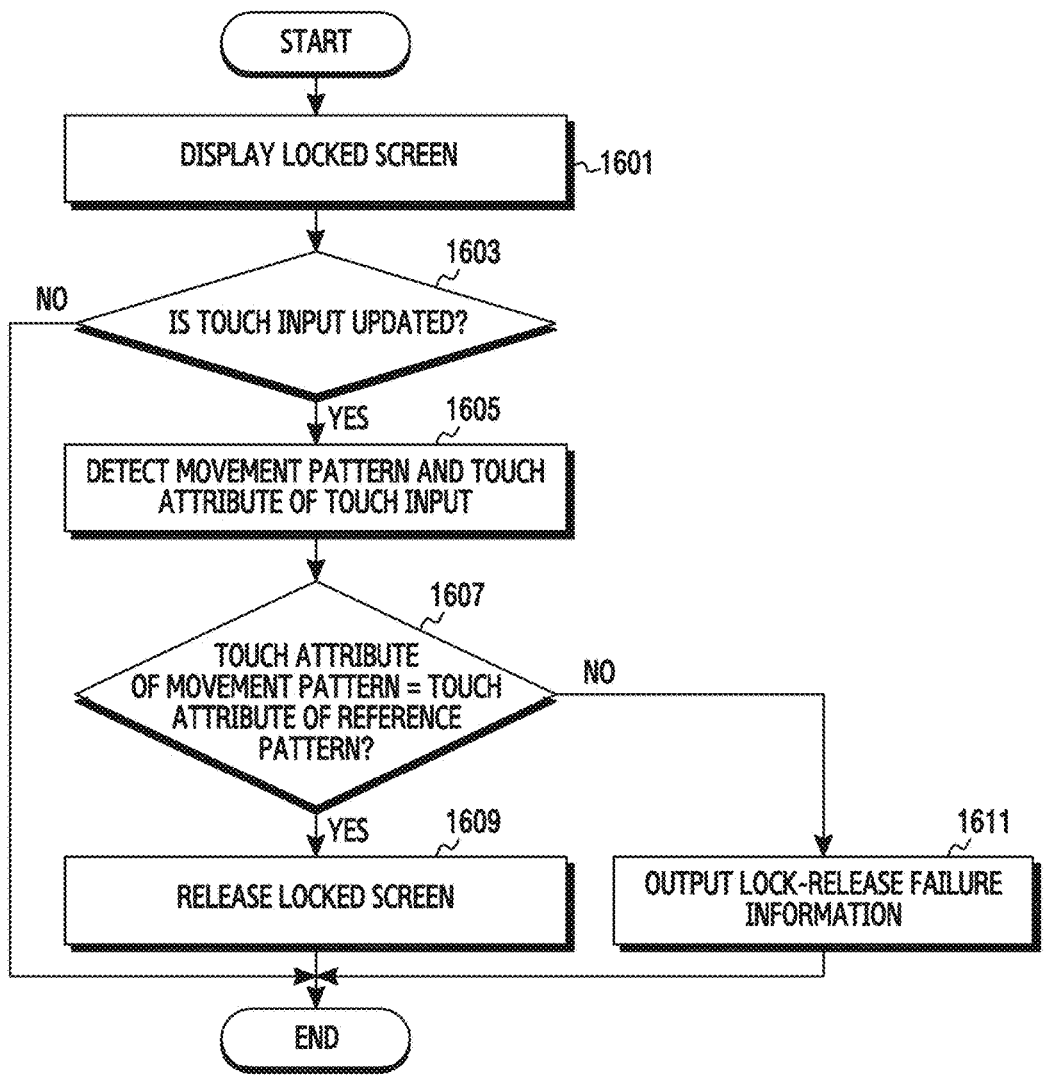
FIG. 16 illustrates a flowchart to release the locked screen based on the touch attributes in the electronic device according to various embodiments of the present disclosure.

FIG. 16 illustrates a flowchart to release the locked screen based on the touch attributes in the electronic device according to various embodiments of the present disclosure. Hereinafter, the operation of releasing the locked screen will be described with reference to the screen configuration of FIGS. 17A and 17B.

Referring to FIG. 16, in operation 1601, the electronic device (e.g., the electronic device 101 of FIG. 1 or the electronic device 201 of FIG. 2) may display a locked screen on the display (e.g., the display 160) in response to the activation event. For example, the processor 120, shown in FIG. 1, may control the display 160 to display a pattern input screen 1700 in response to the input of a control button as shown in diagram of FIG. 17A.

In operation 1603, the electronic device may check whether or not a touch input onto the locked screen displayed on the display is detected. For example, the processor 120 may check whether or not a capacitance change is detected with respect to the touch screen on which the pattern input screen 1700 is displayed as shown in diagram of FIG. 17A.

Figure 17A:
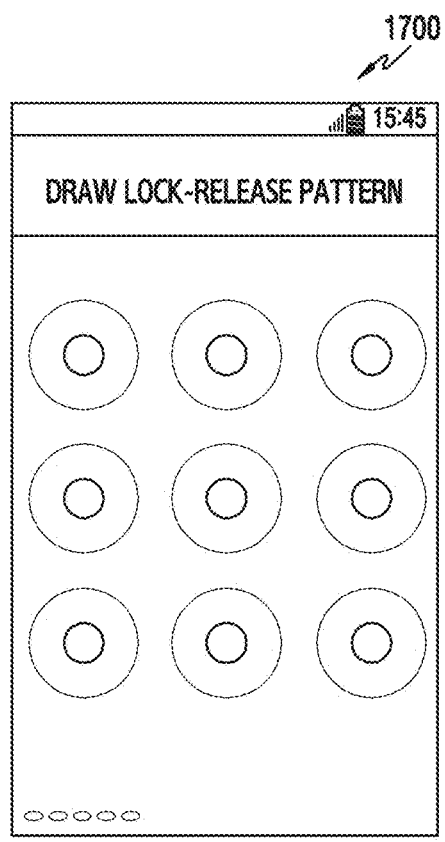
FIGS. 17A and 17B illustrate a screen configuration to release the locked screen based on touch attributes in the electronic device according to various embodiments of the present disclosure.
Figure 17B:
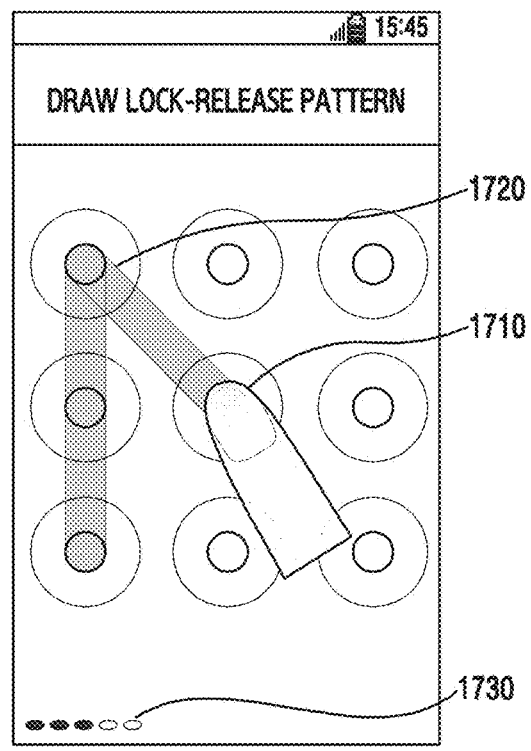

Referring to FIGS. 16, 17A and 17B, in operation 1605, the electronic device may detect the movement pattern and touch attributes of the touch input with respect to the locked screen. For example, the processor 120 may detect the movement pattern of the touch input with respect to the pattern input screen 1700 and the touch intensity of the touch input according to the movement pattern. For example, the processor 120 may control the display 160 to display the movement pattern 1720 of the touch input 1710 on the pattern input screen 1700 as shown in diagram of FIG. 17B. The processor 120 may control the display 1600 to display the touch intensity of the touch input by means of the number of black circles that are included in the icons 1730 displayed in at least a part of the pattern input screen 1700 as shown in diagram of FIG. 17B. Additionally, the processor 120 may control the display 160 to display the touch intensity of the touch input by using graphical elements (e.g., color, transparency, or the like) of the movement pattern 1720, or may output the touch intensity by using a haptic function (e.g., the vibration intensity or a vibration pattern). For example, the processor 120 may differently configure the touch intensity depending on each section in which the direction of the movement pattern is changed in the pattern input screen 1700, or may differently configure the touch intensity between the points in which the direction of the movement pattern can be changed in the pattern input screen 1700.

Referring to FIG. 16, in operation 1607, the electronic device may check whether or not the movement pattern and the touch attribute of the touch input match a reference pattern and a reference touch attribute. For example, the processor 120 may check whether or not the movement pattern and the touch attribute, which are detected in operation 1605, match a reference pattern and a reference touch attribute, which are stored in the memory 130.

If the movement pattern and the touch attribute of the touch input match a reference pattern and a reference touch attribute, the electronic device may release the lock thereof in operation 1609. According to this, the electronic device may display the standby screen or the previous execution screen on the display.

If the movement pattern and the touch attribute of the touch input do not match a reference pattern and a reference touch attribute, the electronic device may output lock-release failure information in operation 1611. For example, if the movement pattern and the touch attribute of the touch input do not match a reference pattern and a reference touch attribute, the processor 120 may control the display 160 to display a lock-release failure message (for example, "Please enter again"). For example, if the movement pattern and the touch attribute of the touch input do not match a reference pattern and a reference touch attribute, the processor 120 may generate a vibration to inform the user of the lock-release failure information.

FIGS. 17A and 17B illustrate a screen configuration to release the locked screen based on touch attributes in the electronic device according to various embodiments of the present disclosure, as described above in relation to the flowchart of FIG. 16.

Figure 18:
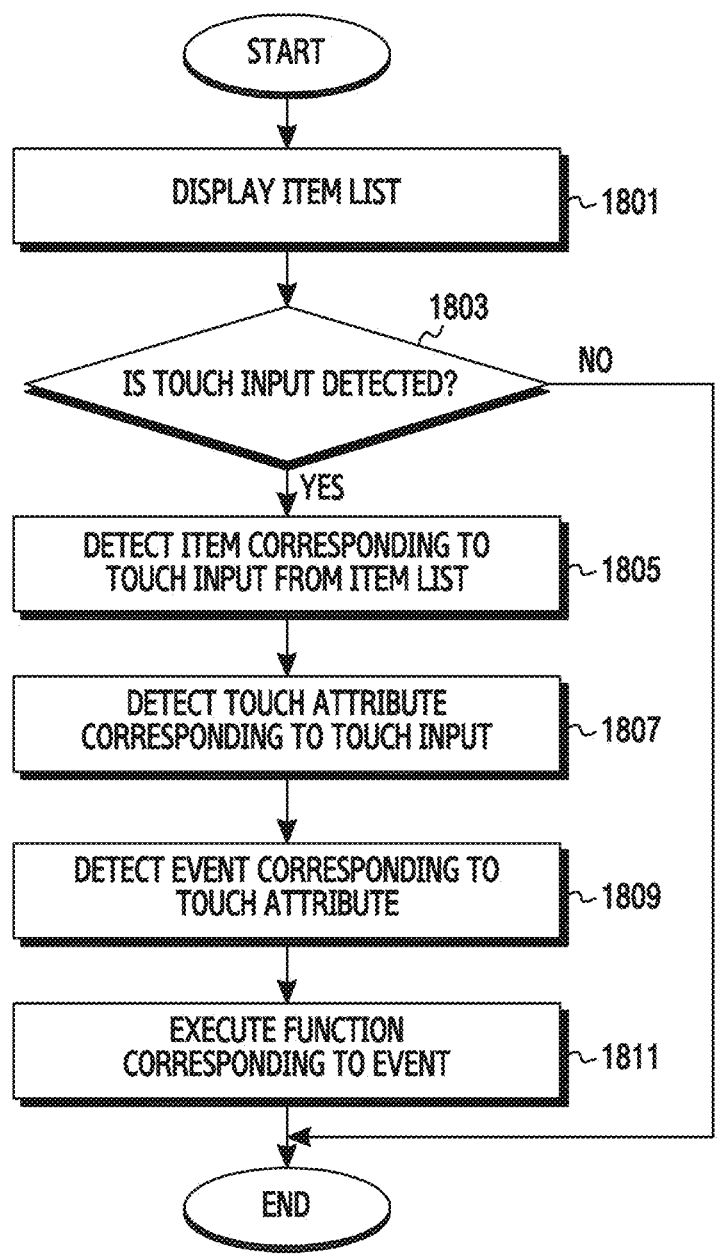
FIG. 18 illustrates a flowchart for generating events with respect to an item list based on touch attributes in the electronic device according to various embodiments of the present disclosure.

FIG. 18 illustrates a flowchart for generating events with respect to an item list based on the touch attributes in the electronic device according to various embodiments of the present disclosure. Hereinafter, the operation of generating the events with respect to the item list based on the touch attributes will be described with reference to FIGS. 19A to 19C.

Referring to FIG. 18, in operation 1801, the electronic device (e.g., the electronic device 101 of FIG. 1 or the electronic device 201 of FIG. 2) may display an item list containing one or more items on the display (e.g., the display 160). For example, when execution information of an e-mail application is detected through the input/output interface 150, the processor 120 may control the display 160 to display an e-mail application execution screen that contains the e-mail list 1900 as shown in FIG. 19A.

Figure 19A:
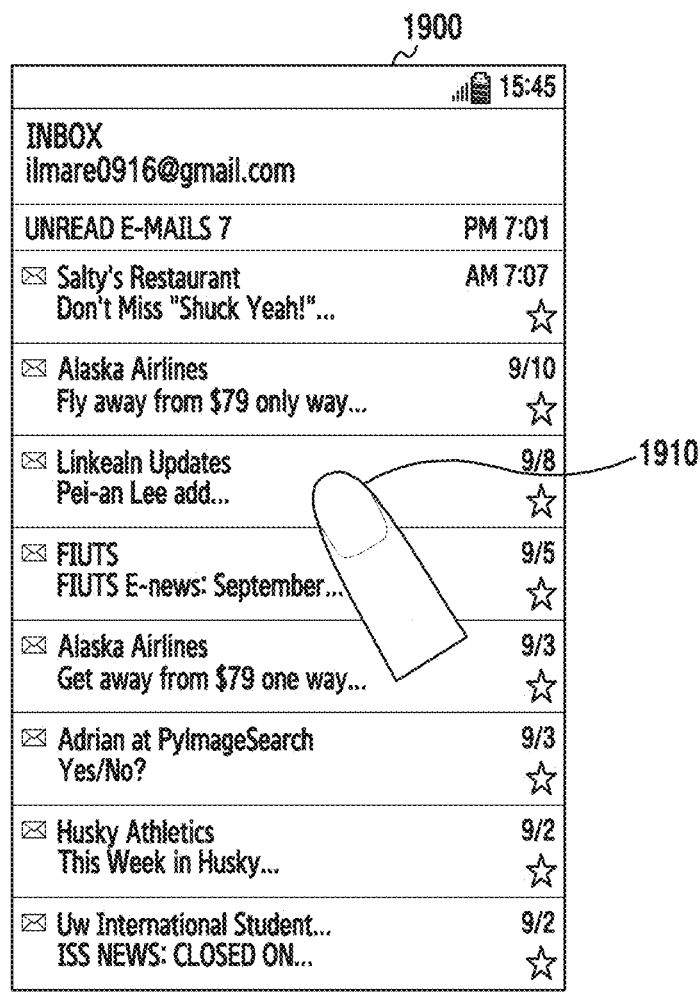
FIGS. 19A to 19C illustrate a screen configuration for generating events with respect to an item list based on touch attributes in the electronic device, according to various embodiments of the present disclosure.

Referring to FIGS. 18 and 19A, in operation 1803, the electronic device may check whether or not a touch input with respect to the item list of the display is detected. For example, the processor 120 may check whether or not a capacitance change (the touch input 1910) is detected with respect to the region where the e-mail list 1900 is displayed in the touch screen as shown in FIG. 19A.

In operation 1805, if a touch input with respect to the item list is detected, the electronic device may detect an item corresponding to the touch input. For example, when the touch input 1910 with respect to the e-mail list 1900 is detected as shown in FIG. 19A, the processor 120 may detect the touch position of the touch input 1910. The processor 120 may detect the e-mail that is selected by the touch position in the e-mail list 1900.

In operation 1807, the electronic device may detect the touch attribute corresponding to the touch input. For example, the processor 120 may detect at least one of the touch intensity or the touch direction based on the capacitance change caused by the touch input.

In operation 1809, the electronic device may detect an event corresponding to the touch attribute. For example, the processor 120 may detect an event that matches at least one of the touch intensity or the touch direction of the touch input for the selection of the item. If an event matching the touch attribute is detected, the processor 120 may further consider the characteristics of an application corresponding to the item list.

Figure 19B:
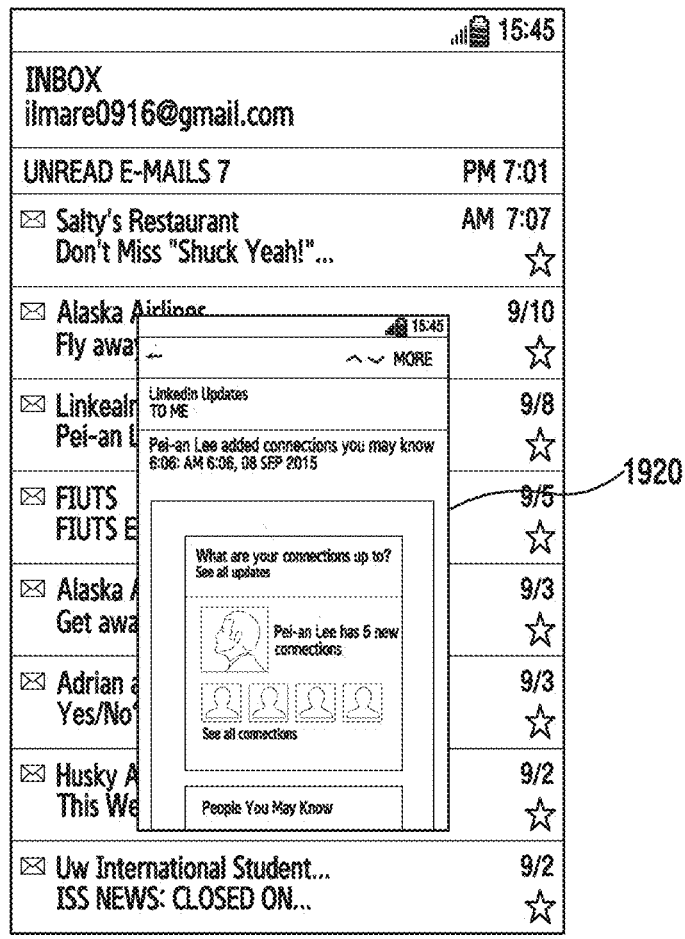
Figure 19C:
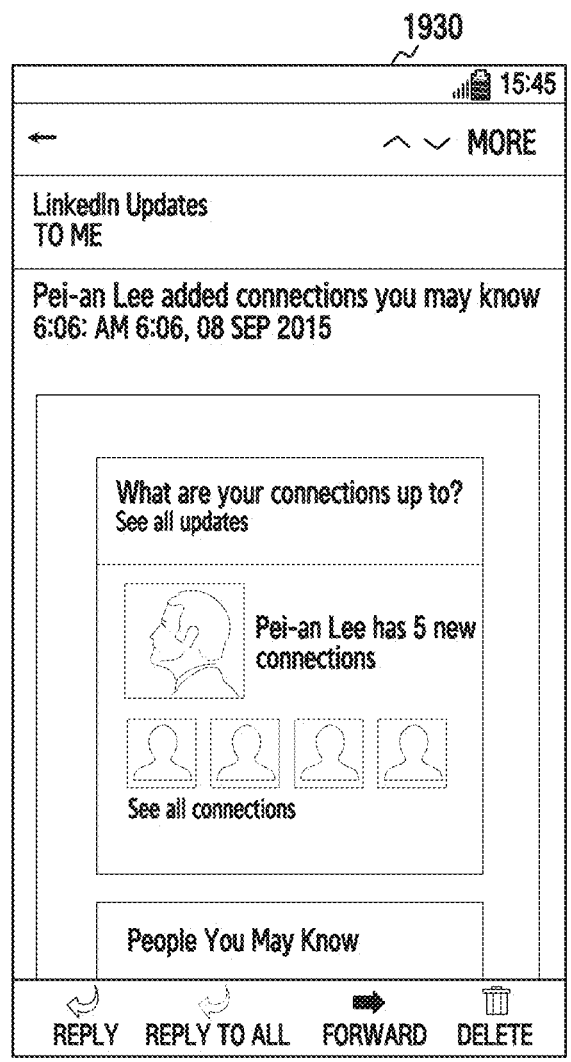

Referring to FIGS. 18, 19B and 19C, in operation 1811, the electronic device may execute a function of the event corresponding to the touch attribute for the item selected by the touch input. For example, if the touch intensity of the touch input corresponds to the first event, the processor 120 may control the display 160 to display a preview screen 1920 of the e-mail that is selected by the touch input 1910 as shown in FIG. 19B. For example, if the touch intensity of the touch input corresponds to the second event, the processor 120 may control the display 160 to display detailed information 1930 of the e-mail that is selected by the touch input 1910 as shown in FIG. 19C.

According to an embodiment of the present disclosure, if the touch intensity of the touch input 1910 is updated to correspond to the second event while the preview screen 1920 of the e-mail selected by the touch input 1910 is displayed as shown in FIG. 19B, the electronic device may control the display 160 to display detailed information 1930 of the e-mail that is selected by the touch input 1910 as shown in FIG. 19C.

According to an embodiment of the present disclosure, if the touch intensity of the touch input 1910 is updated to correspond to the first event while the detailed information 1930 of the e-mail selected by the touch input 1910 is displayed as shown in FIG. 19C, the electronic device may control the display 160 to display the preview screen 1920 of the e-mail selected by the touch input 1910 as shown in FIG. 19B.

According to an embodiment of the present disclosure, if the touch input 1910 is released while the preview screen 1920 of the e-mail selected by the touch input 1910 is displayed as shown in FIG. 19B, the electronic device may control the display 160 to display the e-mail list 1900 as shown in FIG. 19A.

FIGS. 19A to 19C illustrate a screen configuration for generating events with respect to an item list based on touch attributes in the electronic device, according to various embodiments of the present disclosure. FIGS. 19A, 19B and 19C further describes the operation of generating the events with respect to the item list based on the touch attributes in the flowchart of FIG. 18, as described above.

Figure 20:
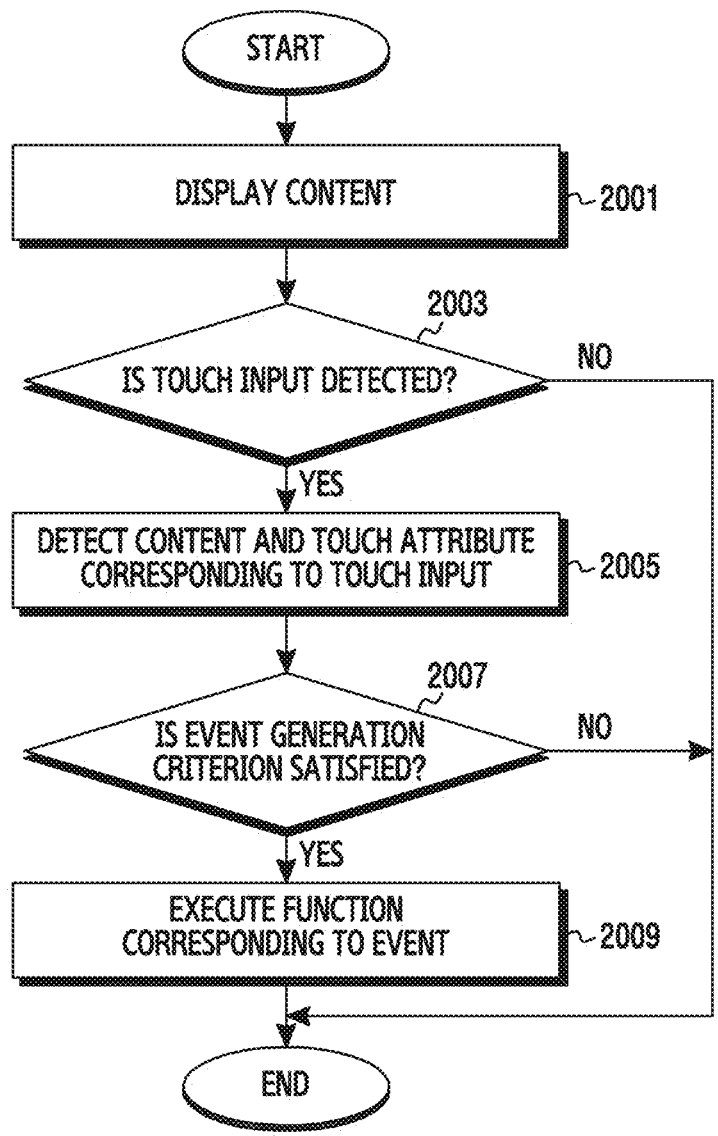
FIG. 20 illustrates a flowchart for generating events corresponding to the characteristics of content and touch attributes in the electronic device according to various embodiments of the present disclosure.

FIG. 20 illustrates a flowchart for generating events corresponding to the characteristics of content and the touch attributes in the electronic device according to various embodiments of the present disclosure.

Referring to FIG. 20, in operation 2001, the electronic device (e.g., the electronic device 101 of FIG. 1 or the electronic device 201 of FIG. 2) may display content on the display (e.g., the display 160) based on input information that is detected through the input/output interface (e.g., input/output interface 150). For example, the processor 120, shown in FIG. 1, may execute a gallery application based on the input information that is detected through the input/output interface 150. In this case, the processor 120 may control the display 160 to display one or more images corresponding to the gallery application.

In operation 2003, the electronic device may check whether or not a touch input corresponding to the content displayed on the display is detected. For example, the processor 120 may check whether or not a capacitance change is detected in the region where the content is displayed on the display 160. For example, if a capacitance change exceeding a reference capacitance is detected, the processor 120 may determine that the touch input has been detected.

In operation 2005, if a touch input corresponding to the content displayed on the display is detected, the electronic device may detect the attribute of the content onto which the touch input has been detected and the touch attribute of the touch input. For example, the processor 120 may detect the type of content onto which the touch input has been detected, the type of application corresponding to the content, or the like. For example, the processor 120 may detect at least one of: the touch intensity; the touch movement direction; or the touch rotation direction based on the capacitance change caused by the touch input.

In operation 2007, the electronic device may check if there is an event generation criterion that is satisfied by the touch attribute among a plurality of event generation criteria corresponding to the content. For example, the processor 120 may check if there is an edit menu corresponding to the touch attribute among the edit menus of the image to be displayed on the display 160.

In operation 2009, if there is an event generation criterion that is satisfied by the touch attribute, the electronic device may execute a function corresponding to the event that is satisfied by the touch attribute. For example, the processor 120 may execute an edit menu corresponding to the touch attribute among the edit menus of the image to be displayed on the display 160.

Figure 21:
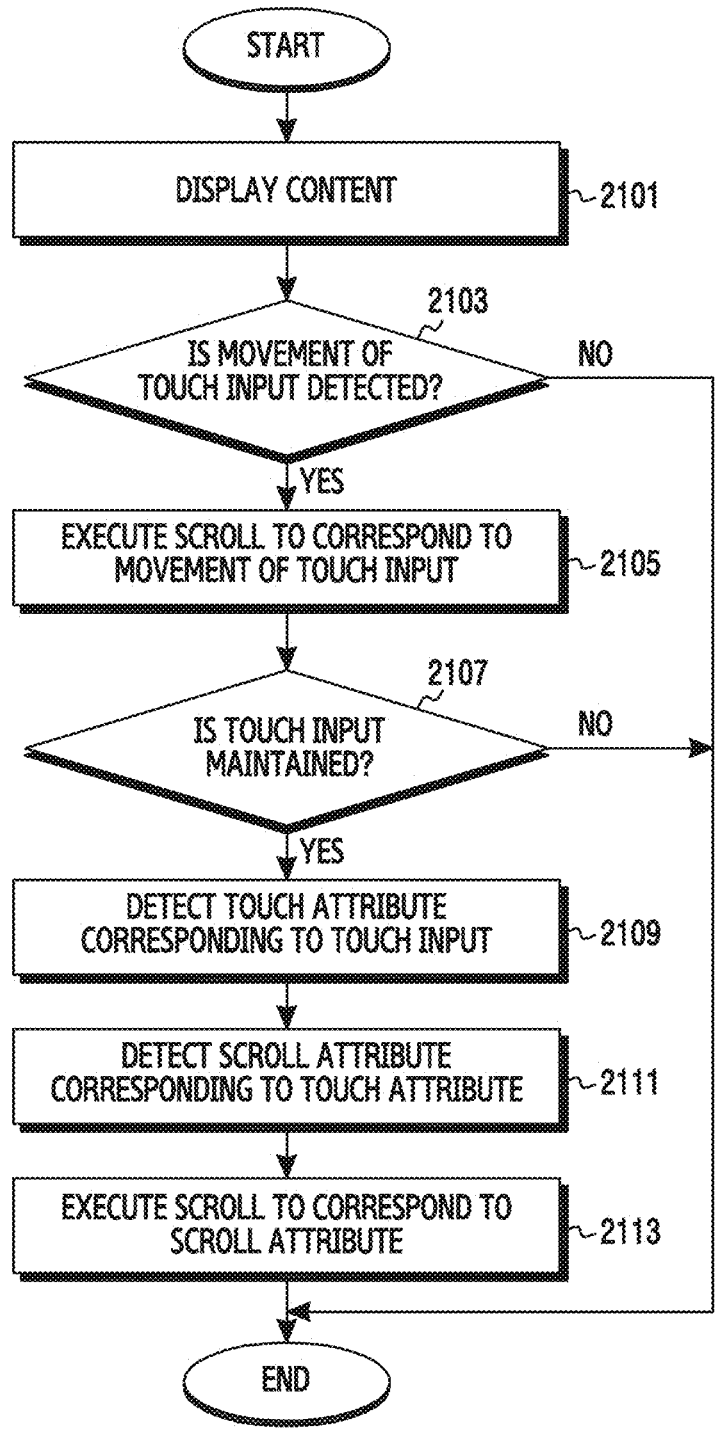
FIG. 21 illustrates a flowchart for providing a scroll function based on touch attributes in the electronic device according to various embodiments of the present disclosure.

FIG. 21 illustrates a flowchart for providing a scroll function based on the touch attributes in the electronic device according to various embodiments of the present disclosure. Hereinafter, the operation of providing a scroll function based on the touch attributes will be described with reference to the screen configuration of FIGS. 22A and 22B.

Referring to FIG. 21, in operation 2101, the electronic device (e.g., the electronic device 101 of FIG. 1 or the electronic device 201 of FIG. 2) may display one or more pieces of content on the display (e.g., the display 160) based on user input information. For example, when execution information of a web application is detected through the input/output interface 150, shown in FIG. 1, the processor 120 may control the display 160 to display a web page 2200 as shown in FIG. 22A.

In operation 2103, the electronic device may check whether or not the movement of the touch input with respect to the content displayed on the display is detected. For example, the processor 120 may detect a capacitance change caused by the touch input 2210 onto the web page displayed on the touch screen as shown in FIG. 22A. The processor 120 may detect the movement 2212 of the touch input to correspond to a change in the touch region where the capacitance change has been detected.

Figure 22A:
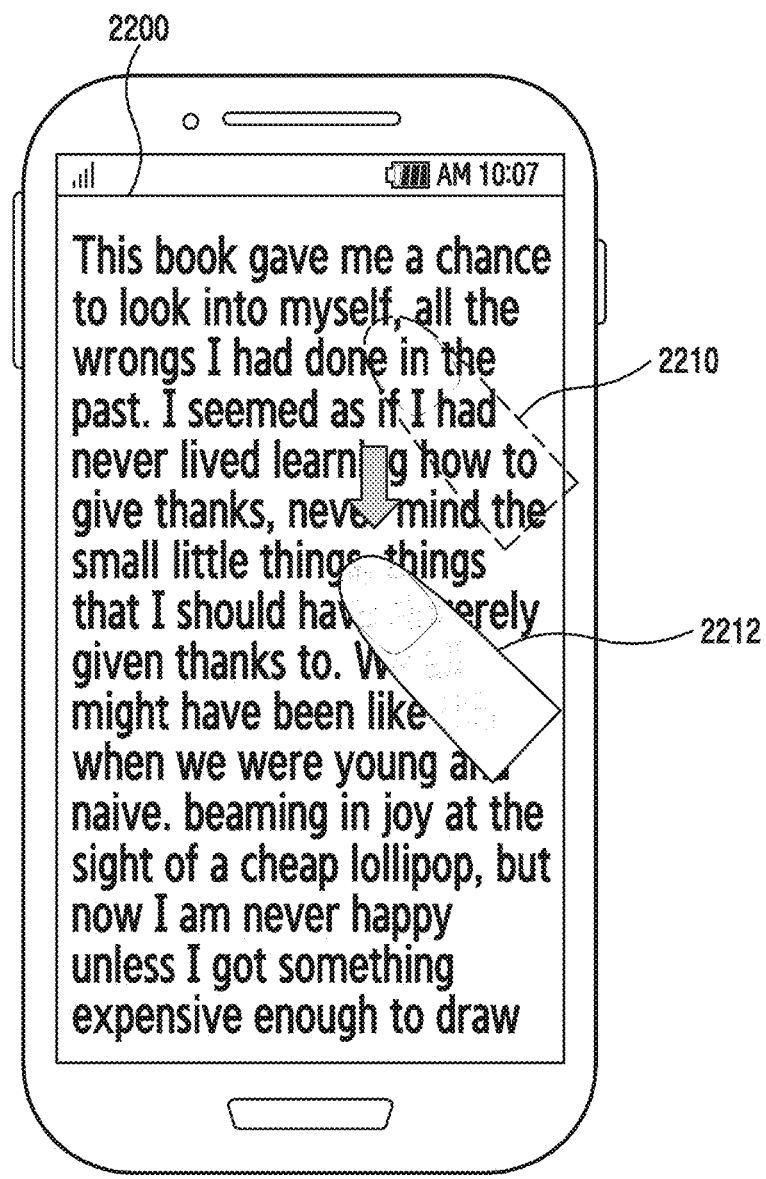
FIGS. 22A and 22B illustrate a screen configuration for providing a scroll function based on touch attributes in the electronic device according to various embodiments of the present disclosure.
Figure 22B:
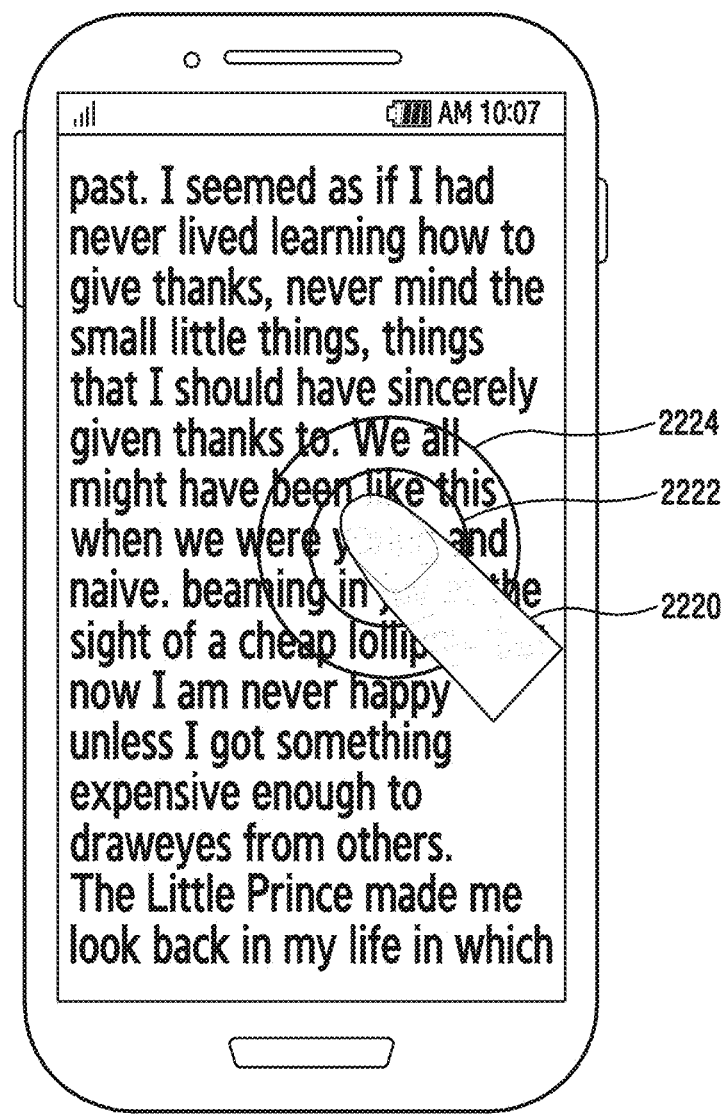

With reference to FIGS. 21, 22A and 22B, if the movement of the touch input is detected, the electronic device may scroll on the content to correspond to the movement direction and the movement distance of the touch input in operation 2105. For example, the processor 120 may control the display 160 such that the web page is scrolled so as to correspond to the distance of the touch input in the movement direction of the touch input as shown in FIG. 22B.

In operation 2107, the electronic device may check whether or not the touch input for the scrolling of the content is maintained. For example, the processor 120 may check whether or not the touch region where the capacitance change has been detected is maintained. That is, the processor 120 may check whether or not the touch input 2220 onto the touch position detected by the capacitance change is maintained.

In operation 2109, if the touch input for the scrolling of the content is maintained, the electronic device may detect touch attributes corresponding to the touch input. For example, referring to FIG. 22B, the processor 120 may detect at least one of the touch intensity 2222 or the touch direction 2224 of the corresponding touch input 2220 based on the capacitance change of the touch region where the touch input is maintained. For example, if the holding time of the touch input 2220 exceeds a reference time, the processor 120 may detect at least one of the touch intensity 2222 or the touch direction 2224 of the corresponding touch input based on the capacitance change of the touch region.

In operation 2111, the electronic device may detect scroll attributes to correspond to the touch attributes of the touch input. For example, the processor 120 may determine at least one of: the scroll speed; the scroll interval; or the scroll direction to correspond to at least one of the touch intensity 2222 or the touch direction 2224 of the touch input.

FIGS. 22A and 22B illustrate a screen configuration for providing a scroll function based on touch attributes in the electronic device according to various embodiments of the present disclosure. FIGS. 22A and 22B further illustrate the operation of providing a scroll function based on the touch attributes in the flowchart of FIG. 21, as described above.

Referring to FIG. 21, in operation 2113, the electronic device may continue to scroll on the content based on the scroll attributes corresponding to the touch attributes of the touch input. For example, the processor 120, shown in FIG. 1, may scroll on the web page in the scroll direction that is executed in operation 2105 based on the scroll speed or the scroll interval corresponding to the touch attributes. For example, the processor 120 may scroll on the web page in the scroll direction corresponding to the touch attributes based on the scroll speed or the scroll interval corresponding to the touch attributes. At this time, the processor 120 may control the display 160 to display touch attribute information 2232 and 2234 in the region where the touch input has been detected so that the user may identify the touch attributes for determining the scroll attributes as shown in FIG. 22B.

According to various embodiments of the present disclosure, an operating method of an electronic device may include: determining touch attributes including or containing the intensity, the direction, or the time of a touch input, at least based on a change in the capacitance that is caused in relation to the touch input by using a touch sensor that is functionally connected to the electronic device; and executing a predetermined function if the touch attributes satisfy predetermined criteria.

According to various embodiments of the present disclosure, the touch attributes may further include the area of a region of the touch sensor by which the touch input is detected.

According to various embodiments of the present disclosure, the executing of the predetermined function may include: executing, as at least a part of the predetermined function, the first predetermined function if the touch attribute is the first intensity, the first direction, or the first time duration; and executing, as at least a part of the predetermined function, the second predetermined function if the touch attribute is the second intensity, the second direction, or the second time duration.

According to various embodiments of the present disclosure, an operating method of an electronic device may include: determining touch attributes including or containing at least one of the intensity, the area, or the direction of a touch input, at least based on a change in the capacitance that is caused in relation to the touch input by using a touch sensor that is functionally connected to the electronic device; and executing a function corresponding to a predetermined criterion if the touch attributes satisfy the predetermined criterion.

According to various embodiments of the present disclosure, the method may further include determining the position of the touch input at least based on a change in the capacitance caused in relation to the touch input.

According to various embodiments of the present disclosure, the executing of the function corresponding to the predetermined criterion may include executing one of: releasing of the locked screen; executing an application program; or executing a control menu corresponding to a predetermined criterion if the touch attributes satisfy the predetermined criterion.

According to various embodiments of the present disclosure, the touch attributes may further include the time duration of the touch input. In addition, it is conceivable to include in the touch attributes, time durations or other touch attributes for multiple touch inputs within a specified time period.

According to various embodiments of the present disclosure, the touch direction may include at least one of the movement direction or the rotation direction of the touch input.

The electronic device and the operating method thereof, according to the various embodiments of the present disclosure, provide the user with a variety of services for a touch input by generating events by using the touch attributes that contain at least one of the intensity, the direction, or the area of the touch input.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a CD-ROM and a DVD), magneto-optical media (for example, a floptical disk), a hardware device (for example, a ROM, a RAM, a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display;
a touch sensor; and
a processor configured to:
detect a touch input by using the touch sensor;
identify, based on at least one change in a capacitance in the touch sensor, a movement pattern and an intensity of the touch input while the touch input is detected;
execute a predetermined function if the identified movement pattern and the intensity satisfy a predetermined criterion; and
restrict an execution of the predetermined function if the identified movement pattern and the intensity do not satisfy the predetermined criterion,
wherein the predetermined function comprises releasing a locked screen, and
wherein the processor is configured to control the display to display the intensity of the touch input by using at least one of a color or a transparency of the movement pattern.

2. The electronic device according to claim 1,
wherein the predetermined criterion comprises a first intensity criterion for a first position and a second intensity criterion for a second position, and
wherein the first intensity criterion is different than the second intensity criterion.

3. The electronic device according to claim 1, wherein the movement pattern comprises at least one of a movement direction of the touch input or a rotation direction of the touch input.

4. The electronic device according to claim 1,
wherein the processor is further configured to determine a plurality of positions corresponding to the movement of the touch input based on a change in the capacitance caused by the touch input, and wherein the information comprises a plurality of touch intensities for the plurality of positions corresponding to the movement of the touch input.

5. The electronic device according to claim 1, wherein the touch sensor comprises a part of the display.

6. The electronic device according to claim 1, wherein the input pattern further comprises at least one of a movement direction of the touch input or a rotation direction of the touch input.

7. An electronic device comprising:
a display;
a touch sensor; and
a processor configured to:
    detect a touch input by using the touch sensor, the touch input having a region where the touch input is being detected and an intensity,
    execute a first function corresponding to a region where the touch input is being detected and the intensity of the touch input,
    determine, based on at least one change in a capacitance in the touch sensor, whether a size of the region where the touch input is being detected and the intensity of the touch input are changed while the touch input is detected,
    control the display to display the intensity of the touch input by using at least one of a color or a transparency of the touch input, and
    when the size of the region where the touch input is being detected and the intensity of the touch input are changed, execute a second function corresponding to the region.

8. The electronic device according to claim 7, wherein the processor is further configured to determine a position of the touch input based on a change in the capacitance caused by the touch input.

9. The electronic device according to claim 7, wherein at least one of the first function or the second function comprises at least one of a releasing of a locked screen, an execution of an application program, or an execution of a control menu.

10. The electronic device according to claim 7, wherein the touch sensor comprises a part of the display.

11. A method of operating an electronic device, the method comprising:
detecting a touch input by using a touch sensor;
identifying, based on at least one change in a capacitance in the touch sensor, a movement pattern and an intensity of the touch input while the touch input is detected;
controlling a display of the electronic device to display the intensity of the touch input by using at least one of a color or a transparency of the movement pattern;
executing a predetermined function if the identified movement pattern and the intensity satisfy a predetermined criterion,
wherein the predetermined function comprises releasing a locked screen.

12. The method according to claim 11, wherein the predetermined criterion comprises an first intensity criterion for a first position and a second intensity criterion for a second position, and
wherein the first intensity criterion is different with the second intensity criterion.

13. The method according to claim 11, further comprising;
determining a plurality of positions corresponding to the movement of the touch input based on a change in the capacitance caused by the touch input,
wherein the information comprises a plurality of touch intensities for the plurality of positions corresponding to the movement of the touch input.

14. The method according to claim 11, further comprising:
restricting an execution of the predetermined function if the identified movement pattern and the intensity do not satisfy the predetermined criterion.

15. The method according to claim 11, wherein the movement pattern comprises at least one of a movement direction of the touch input or a rotation direction of the touch input.

* * * * *